(12) United States Patent
Sugita et al.

(10) Patent No.: US 7,911,919 B2
(45) Date of Patent: Mar. 22, 2011

(54) INFORMATION RECORDING/REPRODUCING DEVICE AND HOLOGRAM RECORDING/REPRODUCING METHOD

(75) Inventors: Tomoya Sugita, Nara (JP); Kenichi Kasazumi, Osaka (JP)

(73) Assignee: Panasonic Corporation, Osaka (JP)

( * ) Notice: Subject to any disclaimer, the term of this patent is extended or adjusted under 35 U.S.C. 154(b) by 380 days.

(21) Appl. No.: 12/293,337

(22) PCT Filed: Mar. 14, 2007

(86) PCT No.: PCT/JP2007/055097
§ 371 (c)(1),
(2), (4) Date: Sep. 17, 2008

(87) PCT Pub. No.: WO2007/114011
PCT Pub. Date: Oct. 11, 2007

(65) Prior Publication Data
US 2009/0225641 A1   Sep. 10, 2009

(30) Foreign Application Priority Data
Mar. 20, 2006   (JP) ................................ 2006-076316

(51) Int. Cl.
*G11B 7/00* (2006.01)
(52) U.S. Cl. ...................... 369/103; 369/120; 369/53.22
(58) Field of Classification Search .................... None
See application file for complete search history.

(56) References Cited

U.S. PATENT DOCUMENTS

| | | | |
|---|---|---|---|
| 5,483,365 A * | 1/1996 | Pu et al. .......................... | 359/11 |
| 6,377,367 B1 | 4/2002 | Suganuma | |
| 7,092,133 B2 | 8/2006 | Anderson et al. | |
| 7,130,092 B1 | 10/2006 | Horimai | |
| 7,167,286 B2 | 1/2007 | Anderson et al. | |
| 7,295,356 B2 | 11/2007 | King | |
| 2002/0114027 A1 | 8/2002 | Horimai | |
| 2002/0191236 A1 | 12/2002 | King | |
| 2003/0063342 A1 | 4/2003 | Horimai | |
| 2004/0179251 A1 | 9/2004 | Anderson et al. | |
| 2006/0050341 A1 | 3/2006 | Horimai | |
| 2006/0109535 A1 * | 5/2006 | Kuroda et al. .................. | 359/24 |
| 2006/0238841 A1 | 10/2006 | Anderson et al. | |

FOREIGN PATENT DOCUMENTS

JP   2000-242157   9/2000

(Continued)

OTHER PUBLICATIONS

International Search Report issued Jun. 19, 2007 in the International (PCT) Application No. PCT/JP2007/055097.

*Primary Examiner* — Joseph Haley
(74) *Attorney, Agent, or Firm* — Wenderoth, Lind & Ponack, L.L.P.

(57) ABSTRACT

An information recording/reproducing device irradiates a signal light beam containing arbitrary two-dimensional information and a reference beam emitted from the same light source as the signal light beam to an arbitrary region of a hologram recording medium to record a first hologram. After the first hologram is recorded, the device changes the incident angle of the signal light beam with respect to the hologram recording medium and multiplex-records a second hologram, which is different from the first hologram, in the same region as the region in which the first hologram is recorded by irradiating a signal light beam whose incident angle has been changed and a reference beam substantially the same as the reference beam used when recording the first hologram while the device obtains at least a part of a diffracted beam from the first hologram simultaneously.

21 Claims, 17 Drawing Sheets

FOREIGN PATENT DOCUMENTS

| | | |
|---|---|---|
| JP | 2000-338846 | 12/2000 |
| JP | 2003-43904 | 2/2003 |
| JP | 2004-272268 | 9/2004 |
| JP | 3652338 | 3/2005 |

* cited by examiner

INFORMATION RECORDING/REPRODUCING DEVICE AND HOLOGRAM RECORDING/REPRODUCING METHOD

TECHNICAL FIELD

The present invention relates to an information recording/reproducing device and a hologram recording/reproducing method of multiplex-recording a plurality of holograms in an arbitrary region of a hologram recording medium and reproducing the holograms.

BACKGROUND ART

With the rapid development of digitization of information and other information technologies, a style that is becoming widespread is to distribute various kinds of contents information, such as videos and sounds, at a high speed while maintaining a high grade for the user to utilize the received information at his end. An information utilization pattern that is often found at the user's end is to save the distributed data temporarily, for example, in a hard disk or the like and then to accumulate information in another recording medium by choosing and editing the information the user wishes to save for a long period. In order to meet an explosive increase of an information volume and a change of the information utilization style for the high-grade information as described above, there has been a need for a system capable of realizing ultra-high speed recording and reproduction and an ultra-large capacity.

As one of promising means to satisfy the requirements above, there has been proposed a hologram optical information recording/reproducing device (also referred to as a hologram memory and a holographic memory) utilizing photon mode optical information recording. The hologram recording/reproducing method is a method to record a signal light beam modulated according to data to be recorded and a reference beam in a hologram recording medium in the form of an interference fringe and to reproduce data recorded in the hologram recording medium by irradiating a readout beam (reproducing reference beam) that is equivalent to the reference beam to the hologram recording medium in which the data is recorded.

As the hologram memory optical information recording system described above, for example, there is a hologram memory optical system adopting shift multiplexing recording proposed by Psaltis et al. In the hologram memory optical system adopting shift multiplexing recording, the beam diameter of light from the laser light source is expanded by a beam expander and the light is divided to two beams by a half mirror. One of the divided beams passes through a spatial light modulator and forms a signal light beam as it is focused on a hologram recording medium by a Fourier transform lens. The other beam serves as the reference beam that irradiates the hologram recording medium at the same position as the signal light beam. A hologram medium, such as photopolymers, is encapsulated in a space between two glass substrates of the hologram recording medium, and an interference fringe of the signal light beam and the reference beam is recorded in the hologram medium.

The spatial light modulator is formed of optical switch arrays aligned two-dimensionally and the respective optical switches are switched ON and OFF independently in response to an input signal to be recorded. For example, in a case where a spatial light modulator formed of 1024 cells× 1024 cells is used, 1 M bits of information can be displayed simultaneously. When the signal light beam passes through the spatial light modulator, 1 M bits of information displayed on the spatial light modulator is converted to two-dimensional light beam arrays and recorded on a hologram recording medium in the form of an interference fringe. When the recorded signal is reproduced, the reference beam alone is irradiated to the hologram recording medium and a diffracted beam (referred to also as reproduced beam) from the hologram is received at a two-dimensional image capturing portion, such as a CCD element.

The hologram memory optical information recording system is characterized in that the hologram medium is as thick as about 1 mm and information in the form of an interference fringe is recoded as a thick grating, that is, a so-called Bragg grating, which enables multiplexing recoding and hence a large-capacity optical recording system. This system realizes angle multiplexing by shifting the irradiation position of a spherical-wave reference beam instead of changing the incident angle of the reference beam. In other words, this system exploits the fact that when the recording position is shifted by slightly rotating a disk-shaped medium (a hologram recording medium), the incident angle of the reference beam sensed at the respective portions of the medium changes slightly.

Given that the thickness of the hologram medium is 1 mm, then the wavelength selectivity defined by the intensity of a reproduced signal is found to be the full width at half maximum of 0.014 degree. By multiplex-recording holograms at an interval of about 20 microns when the NA of the reference beam is 0.5 and the hologram size is 2 mm$\phi$, the recording density achieved in this case is 600 G bits/inch$^2$, which is 730 GB of a disk capacity in a 12-cm-diameter disk.

As other multiplexing recording methods, for example, it is possible to multiplex-record a plurality of holograms in one recording region of a hologram recording medium by using means for changing the incident angle of the reference beam or the phase distribution of the reference beam each time one piece of two-dimensional information is recorded in the form of a hologram. These multiplexing recording methods make it possible to record data at extremely high density and these methods have a feature that a recording capacity can be enhanced dramatically in comparison with conventional optical disks (compact disks abbreviated as CDs, digital versatile disks abbreviated as a DVDs, and so forth). In addition, these methods make it possible to record and reproduce two-dimensional information displayed on the spatial light modulator at a time. Extremely high-speed data access in comparison with CDs and DVDs can therefore be achieved.

For a hologram recording medium, various materials, including an organic material, such as photopolymers, and an inorganic material called photorefractive crystals, are proposed. Studies and developments have been carried out extensively from the viewpoints of the basic characteristics of materials, such as the recording sensitivity, the recording capacity, and the information retaining capability, as well as from the viewpoints of the manufacturing method and the cost.

Because the hologram recording/reproducing method is an information recording/reproducing method using a photon mode of light, the hologram recording medium is a so-called photosensitive material by nature of the recording method and it has sensitivity to light at a wavelength not exceeding the visible light range. Accordingly, when a non-recorded region of the recording medium is exposed to light before the recording, crucial characteristic deterioration, such as a reduction of a recordable capacity, can occur. In practice, however, in order to facilitate the handling, photon mode optical information recording media, such as a hologram recording medium, contain a reaction retardant. These media therefore have a non-linearity with respect to the photosensitive characteristic and remain unexposed under low-power light irradiation conditions.

Meanwhile, the multiplexing recording/reproducing method, which is one of the most noticeable features of the hologram recording/reproducing method, has been also developed vigorously. For example, as is disclosed in Patent Document 1, there is angle multiplexing by which multiplexing recording and reproduction are carried out at the same region by changing the incident angle of one or both of the reference beam and the signal light beam with respect to the hologram recording medium, and as is disclosed in Patent Document 2, there is peristrophic multiplexing by which multiplexing recording is carried out by rotating the incident directions of the reference beam and the signal light beam with respect to the normal line to the hologram recording medium. In angle multiplexing described above, the incident angle can be changed by mechanical means, such as a galvanometer mirror, and electric means, such as a deflector using an acousto-optic element or an electro-optic element.

In addition, as still another multiplexing recording method, Patent Document 3 discloses polytopic multiplexing characterized in that a plurality of adjacently multiplexed holograms that will be reproduced simultaneously are filtered using an aperture of the like so that a reproduced beam by substantially one hologram alone is retrieved. Further, as is disclosed in Patent Document 4, there has been proposed to combine angle multiplexing and peristrophic multiplexing by constituting luminous flux deflecting means and deflection control means from a wedge-shaped prism and rotational operation means for rotating the prism.

The proposals of the hologram recording/reproducing method including the proposals of the multiplexing methods as described above are chiefly to achieve an enhancement of the recording capacity by increasing the multiplicity in the hologram recording medium, or to remove factors that lowers the diffraction efficiency, such as erasing of holograms caused by multiplexing recording, and therefore provide the principle underlying the multiplexing recording in the hologram recording medium.

Incidentally, as with the optical disks, such as CDs and DVDs, it is necessary to check (or verify) whether the recorded data (two-dimensional information) is the desired data also in the information recording and reproduction by the hologram recording/reproducing method. To this end, Patent Document 5 proposes a direct read after write (hereinafter, abbreviated as DRAW) function. This function exploits the fact that a diffracted beam (that is, a reproduced image) from the currently recorded interference fringe can be obtained because once the recording of an interference pattern in the hologram recording medium is started, the recording reference beam serves also as the reproducing reference beam. Patent Document 5 describes that it is possible to reproduce or check the currently recorded information simultaneously with or immediately after the recording by retrieving the reproduced image using a CCD or the like.

However, in the case of using an organic material, such as photopolymers, which is a hologram recording material of a write once read many (abbreviated as WO or WORM) type generally used extensively, in the hologram recording/reproducing method for carrying out photon mode recording, for example, optical recording is carried out by utilizing a change of the refractive index during polymerization from monomer to polymer. In this instance, there is a time zone (called a dark reaction) in which molecules migrate over a certain time after irradiation of light until a refractive index distribution that should be obtained in the end is formed inside the hologram recording medium. Accordingly, the dark reaction has to be completed (a certain time has to elapse) in order to reproduce the information. This poses a problem that it is substantially difficult to achieve information recording at a high transfer rate by reproducing and verifying the recorded information simultaneously with the recording of information or immediately after the recording. This is a problem arising from the dark reaction, which is an essential physical phenomenon known as a behavior of the hologram recording material. It is therefore difficult to solve this problem by the proposal disclosed in Patent Document 5.

Also, in a case where the information is reproduced and checked after the recording by taking the time needed for the dark reaction into account, because it is necessary to irradiate the reproducing reference beam, it is difficult to reproduce and check the recorded information without deteriorating the recordable capacity of the hologram recording medium in a state where the multiplicity in an arbitrary region of the hologram recording medium has not reached a desired target value (the feasible maximum multiplicity). Hence, in order to avoid deterioration of the recording capacity, the recorded information has to be checked after the recording to the feasible maximum multiplicity ends in at least an arbitrary region in which multiplexing recording is carried out. For example, in a case where the sequence to check the recorded information by saving the recorded information temporarily in a buffer memory equipped inside the device is adopted, a volume of data to be saved increases with an increase of the recording capacity by increasing the multiplicity as a capability of the hologram recording medium. This poses a problem that a large buffer memory is required. Also, in a case where no buffer memory is provided, it is necessary to check the recorded information by reading out the recorded information again. This poses a problem that the time needed for the checking becomes longer.

In the hologram recording materials used for discussion by the inventors of the present application to date, there is a phenomenon that the sensitivity of the recording material changes with the progress of the multiplexing recording (an increase of the multiplicity). However, there is no technique to understand a change of the recording sensitivity while the recording is taking place. Hence, there is a problem that it is necessary to understand in advice the recording sensitivity characteristic of the hologram recording medium to be used for particular recording scheduling (for example, arrangements regarding the light exposure time and recording intervals when the N'th hologram is recorded during multiplexing recording) through conformation by actually consuming a part of the hologram recording medium to be used.

Also, it is necessary to ensure the characteristic of a hologram to be recorded by correcting the recording scheduling in response to a change of the recording sensitivity when the recording state changes due to a variance of the in-plane characteristic of the hologram recording medium and a characteristic change of the light source and the recording optical system. However, there is a problem that the incapability of understanding the recording sensitivity of the hologram recording material in the multiplexing recording region makes the correction difficult. Further, as with the foregoing, it is also necessary to confirm the recording sensitivity that varies from one material sample to another and deterioration with time of the recording sensitivity characteristic by carrying out test recording to understand the recording sensitivity.

Patent Document 1: JP-A-2003-43904
Patent Document 2: U.S. Pat. No. 5,483,365
Patent Document 3: JP-A-2004-272268

Patent Document 4: JP-A-2000-338846
Patent Document 5: Japanese Patent No. 3652338

DISCLOSURE OF THE INVENTION

An object of the invention is to provide an information recording/reproducing device and a hologram recording/reproducing method capable of reproducing and checking information recorded in a hologram recording medium at a high speed while preventing deterioration of a recordable capacity of the hologram recording medium.

An information recording/reproducing device according to one aspect of the invention includes: a spatial light modulator configured to form a signal light beam containing arbitrary two-dimensional information; a signal light beam irradiation optical system configured to irradiate the signal light beam to an arbitrary region of a hologram recording medium; a reference beam irradiation optical system configured to irradiate a reference beam emitted from a same light source as the signal light beam to the region of the hologram recording medium to which the signal light beam is irradiated; a diffracted beam obtaining portion configured to obtain a diffracted beam from the hologram recording medium; and an optical axis changing portion configured to change an incident angle of the signal light beam with respect to the hologram recording medium. The signal light beam irradiation optical system and the reference beam irradiation optical system irradiate the signal light beam and the reference beam, respectively, to the arbitrary region of the hologram recording medium to record a first hologram. The optical axis changing portion changes the incident angle of the signal light beam with respect to the hologram recording medium after the first hologram is recorded, and the signal light beam irradiation optical system and the reference beam irradiation optical system irradiate, respectively, a signal light beam whose incident angle has been changed and a reference beam substantially same as the reference beam used when recording the first hologram to multiplex-record a second hologram, which is different from the first hologram, in a region same as the region in which the first hologram is recorded while the diffracted beam obtaining portion obtains at least a part of a diffracted beam from the first hologram simultaneously.

A hologram recording/reproducing method according to another aspect of the invention is configured to record a first hologram by irradiating a signal light beam containing arbitrary two-dimensional information and a reference beam emitted from a same light source as the signal light beam to an arbitrary region of a hologram recording medium, and change an incident angle of the signal light beam with respect to the hologram recording medium after the first hologram is recorded and multiplex-record a second hologram, which is different from the first hologram, in a same region as the region in which the first hologram is recorded by irradiating a signal light beam whose incident angle has been changed and a substantially same reference beam as the reference beam used when recording the first hologram while at least a part of a diffracted beam from the first hologram is obtained simultaneously.

According to the configurations described above, when a plurality of holograms are multiplex-recorded in an arbitrary region of the hologram recording medium and reproduced, already recorded another first hologram is reproduced simultaneously when an arbitrary second hologram is recorded. It thus becomes possible to use a reference beam used to record the second hologram for reproducing the first hologram. Accordingly, it is not necessary to irradiate a reproducing reference beam. Hence, it is possible to reproduce information recorded in the hologram recording medium at a high speed while preventing deterioration of a recordable capacity of the hologram recording medium, which makes it possible to check the reproduced information at a high speed.

BEST MODE FOR CARRYING OUT THE INVENTION

Hereinafter, the best mode for carrying out the invention will be described using the drawings.

First Embodiment

Figure 1:
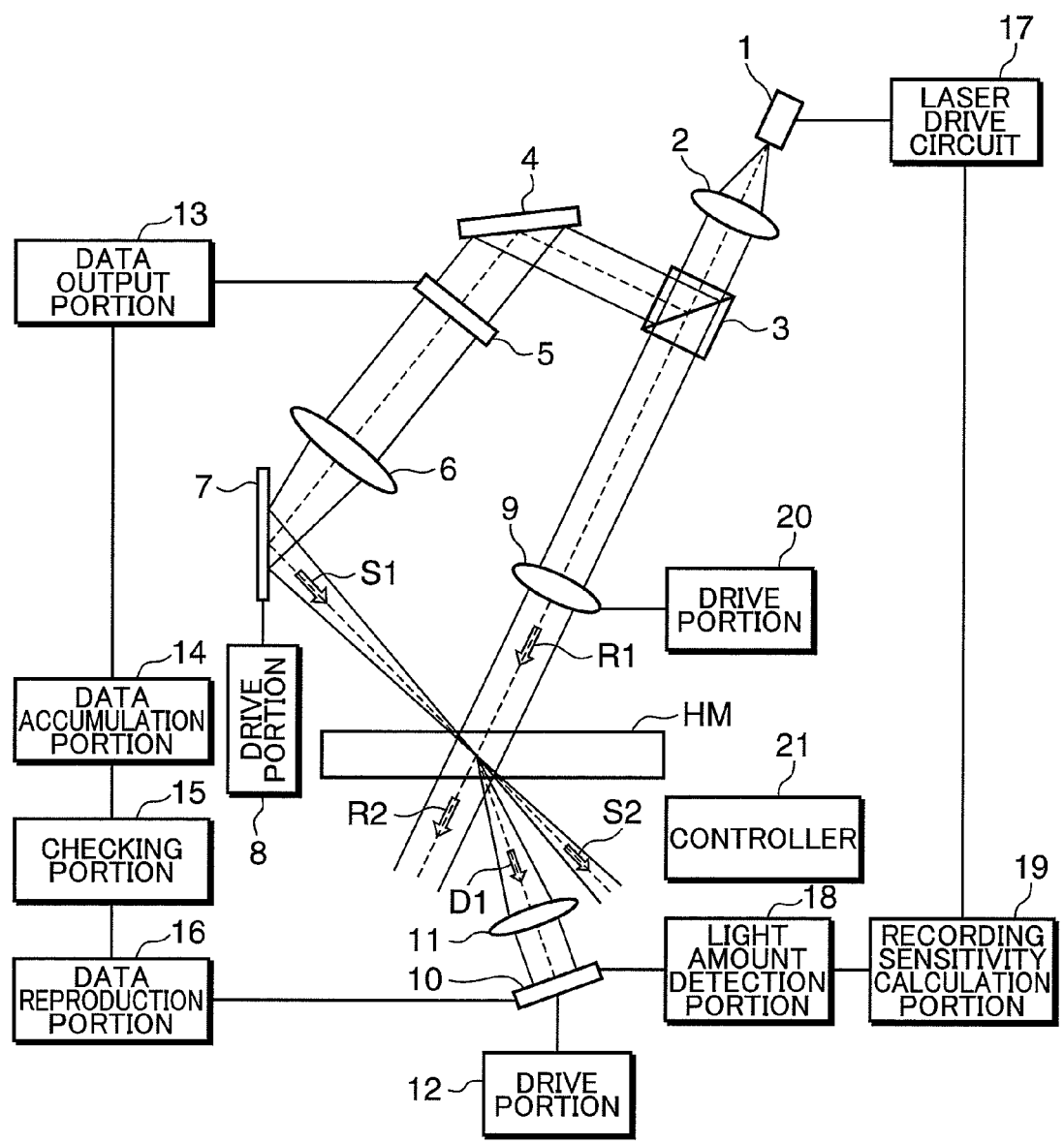
FIG. 1 is a view schematically showing the configuration of an information recording/reproducing device according to a first embodiment of the invention.

FIG. 1 is a view schematically showing the configuration of an information recording/reproducing device according to a first embodiment of the invention. The information recording/reproducing device shown in FIG. 1 includes a laser light source 1, a beam expander 2, a polarization beam splitter 3, a mirror 4, a spatial light modulator 5, a Fourier transform lens 6, a movable mirror 7, a drive portion 8, a reference beam irradiation optical system 9, a two-dimensional image capturing portion 10, a reproduction optical system 11, a drive portion 12, a data output portion 13, a data accumulation portion 14, a checking portion 15, a data reproduction portion 16, a laser drive circuit 17, a light amount detection portion 18, a recording sensitivity calculation portion 19, a drive portion 20, and a controller 21. In FIG. 1, connection lines between the controller 21 and other circuit blocks are omitted for ease of illustration and optical components, such as a ½ wavelength plate, are omitted where appropriate.

The diameter of a light beam emitted from the laser light source 1 is expanded by the beam expander 2. The expanded beam is split to a signal light beam S1 and a reference beam R1 by the polarization beam splitter 3. The signal light beam S1 is reflected on the mirror 4 to go incident on the spatial light modulator 5. The data output portion 13 encodes the data to be recorded and outputs two-dimensional information (two-dimensional image information) to the spatial light modulator 5. The spatial light modulator 5 forms a signal light beam containing the two-dimensional information and guides the signal light beam to the Fourier transform lens 6. The signal light beam irradiation optical system is formed of the Fourier transform lens 6, the movable mirror 7, and so forth. The Fourier transform lens 6 and the movable mirror 7 irradiate the signal light beam S1 to a desired region of a hologram recording medium HM. The irradiation optical system 9 is driven by the drive portion 20 and irradiates the reference beam R1 to the desired region (the region to which the signal light beam S1 is irradiated) of the hologram recording medium HM (hereinafter, referred to simply as the recording medium HM). In this manner, for example, a hologram A is recorded in the recording medium HM.

The movable mirror 7 is driven by the drive portion 8 and configured to be capable of changing the incident angle of the signal light beam. For example, after the hologram A is recorded, the movable mirror 7 is driven by the drive portion 8 to change the incident angle of the signal light beam S1. The Fourier transform lens 6 and the movable mirror 7 irradiate a signal light beam at the incident angle different from the incident angle at the time of the recording of the hologram A. The irradiation optical system 9 irradiates the reference beam R1 at the same incident angle as the incident angle at the time of the recording of the hologram A. Consequently, a hologram B different from the hologram A is multiplex-recorded in the same region as the region of the hologram recording medium HM in which the hologram A is recorded. As the movable mirror 7 serving as an optical axis changing portion, a mechanical optical changing portion, such as a galvanometer mirror, can be used. It should be appreciated that the optical axis changing portion is not particularly limited to this example, and an electric optical axis changing portion, such as a deflector using an acousto-optic element or an electro-optic element, can be used as well. In this regard, the same applies to the optical axis changing portion described below.

The two-dimensional image capturing portion 10 and the reproduction optical system 11 are driven integrally by the drive portion 12 and configured to be capable of receiving diffracted beams (also referred to as reproduced beams) from various holograms. For example, simultaneously with the recording of the hologram B, the reproduction optical system 11 forms an image of a diffracted beam D1 from the hologram A by means of the two-dimensional image capturing portion 10 and the two-dimensional image capturing portion 10 obtains the two-dimensional information of the hologram A from the diffracted beams D1 that is imaged. The data reproduction portion 16 receives the two-dimensional information from the two-dimensional image capturing portion 10 and decodes the two-dimensional information to restore the data.

The data accumulation portion 14 obtains data represented by the two-dimensional information to be recorded from the data output portion 13 and temporarily stores the data therein. The checking portion 15 checks the data stored in the data accumulation portion 14 against the data reproduced by the data reproduction portion 16 and outputs the checking result to the controller 21.

The light amount detection portion 18 receives an output voltage representing the two-dimensional information from the two-dimensional image capturing portion 10 and detects a light amount of the diffracted beam D1 from the hologram A recorded in the hologram recording medium HM by calculating the intensity of the diffracted beam through a predetermined computation using the light receiving area and the output voltage value of the two-dimensional image capturing portion 10. The recording sensitivity calculation portion 19 calculates the current recording sensitivity of the hologram recording medium HM on the basis of the light amount of the diffracted beam detected by the light amount detection portion 18. The laser drive circuit 17 controls an output of the laser light source 1 to be a light exposure energy amount (that is, the irradiation light amount and the irradiation time) that suits the calculated recording sensitivity. The controller 21 controls the respective portions to perform the respective operations as described above.

The hologram recording/reproducing method and the information recording/reproducing device of the first embodiment will now be described in the point that it becomes possible to reproduce already recorded another hologram A simultaneously with the recording of an arbitrary hologram B and in the point that it becomes possible to check the recorded data of the hologram A by this capability.

Figure 2A:
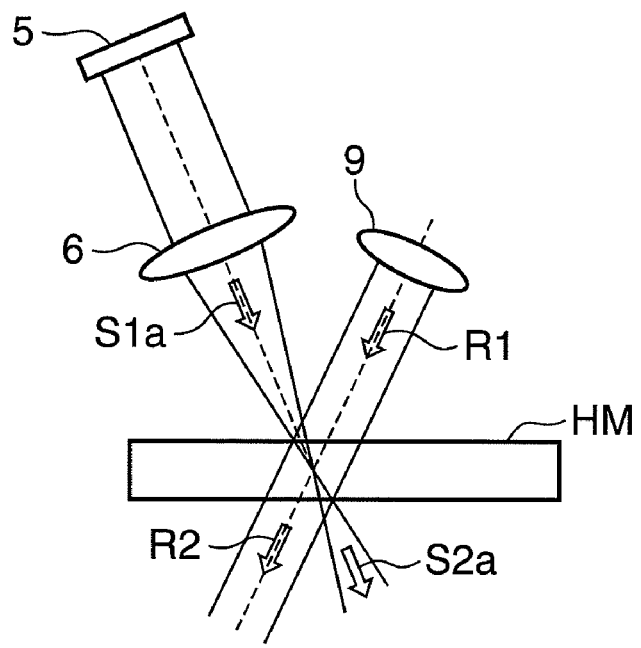
FIG. 2A is a view schematically showing the configuration to record a hologram A in an arbitrary region of a hologram recording medium as an example of a hologram recording/reproducing method of the first embodiment.
Figure 2B:
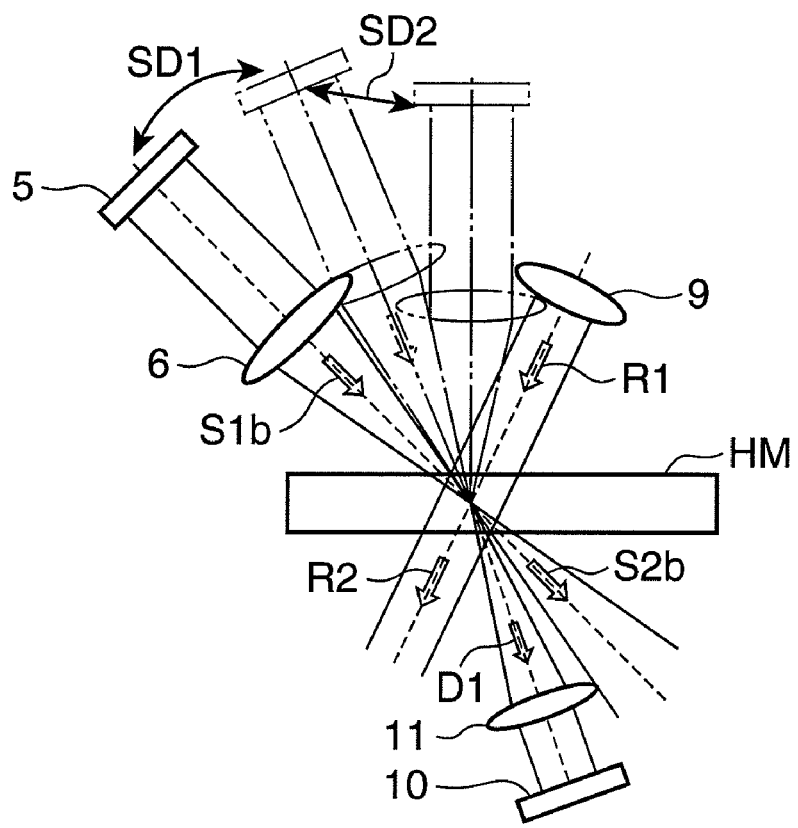
FIG. 2B is a schematic view showing an example of the configuration to reproduce the hologram A simultaneously when a different hologram B is recorded in the region same as the region in which the hologram A is recorded in the first embodiment.

FIG. 2A and FIG. 2B are schematic views showing an example of the hologram recording/reproducing method by the information recording/reproducing device shown in FIG. 1. FIG. 2A is a schematic view when a hologram A having arbitrary two-dimensional information is recorded in an arbitrary region of a hologram recording medium. FIG. 2B is a schematic view when a hologram B having two-dimensional information different from that of the hologram A is recorded in the same region. For ease of description about the recording principle and the reproduction principle, the movable mirror 7 and the like are omitted in FIG. 2A and FIG. 2B to show a manner in which a signal light beam is irradiated from the spatial light modulator 5 and the Fourier transform lens 6 to the recording medium HM and to describe the Fourier transform lens 6 as the signal light beam irradiation optical system. The same applies to other drawing to which reference is made below.

Referring to FIG. 2A and FIG. 2B, HM denotes a recording medium in which holograms are recorded, numeral 5 denotes a spatial light modulator that forms two-dimensional information to be recorded, S1a denotes a signal light beam containing the two-dimensional information formed by the spatial light modulator 5, numeral 6 denotes the signal light beam irradiation optical system that irradiates the signal light beam S1a to a desired region of the recording medium HM, R1 denotes a reference beam emitted from the same light source as the signal light beam S1a, numeral 9 denotes the reference beam irradiation optical system that irradiates the reference beam R1 to the desired region of the recording medium HM, R2 denotes a reference beam passing through the recording medium HM, S2a denotes a signal light beam passing through the recording medium HM, D1 denotes a reproduced beam diffracted by the hologram A already recorded in the recording medium HM by irradiating the reference beam R1 to the recording medium HM, numeral 10 denotes the two-dimensional image capturing portion formed of a CCD that detects and obtains the reproduced beam D1, and numeral 11 denotes the reproduction optical system that forms an image of the reproduced beam D1 on the light receiving surface of the two-dimensional image capturing portion 10.

Referring to FIG. 2A and FIG. 2B, the signal light beam S1a irradiated to the recording medium HM is shown as a converging beam. The invention, however, is also applicable to a case where, for example, the signal light beam S1a is a parallel beam or a divergent beam, and similar effects can be achieved. Also, in this embodiment, angle multiplexing recording will be described as the hologram recording method by way of example. It should be appreciated, however, that the invention is not limited to this example. In addition, a CMOS sensor or the like is also available as the two-dimensional image capturing portion 10.

Hereinafter, the functions of the configuration as above will be described. Because coherent light is normally used for recording/reproducing holograms, beams are coherent light also in this embodiment unless specified otherwise.

Initially, referring to FIG. 2A, light emitted from the light source is readily divided to two beams (not shown) by an optical component, for example, a beam splitter or a half mirror. One of the divided beams is modulated by the spatial light modulator 5 to generate the signal light beam S1a having desired two-dimensional information. The other divided beam is used as the reference beam R1 for the hologram recording. The signal light beam S1a is irradiated to an arbitrary region on the recording medium HM by the signal light beam irradiation optical system 6 and the reference beam R1 is irradiated to the recording medium HM by the reference beam irradiation optical system 9 so as to overlap the irradiation region of the signal light beam S1a (preferably, to cover the entire irradiation region of the signal light beam S1a in order to prevent a loss of the two-dimensional information to be recorded).

The spatial light intensity distribution (interference pattern) formed by the overlapping of the signal light beam S1a and the reference beam R1 gives rise to a physical or chemical change of the material forming the recording medium HM. The refractive index distribution reflecting the interference pattern is thus formed inside the recording medium HM. This process is the so-called hologram recording. In this instance, a part of the signal light beam S1a and a part of the reference beam R1 are absorbed into the material forming the recording medium HM as light energy and used as the energy source of the physical or chemical change. The rest of the signal light beam S1a and the rest of the reference beam R1 that were not absorbed pass through the recording medium HM (a signal light beam S2a and a reference beam R2, respectively) as is shown in FIG. 2A. Let the hologram recorded in this instance be the hologram A.

Subsequently, another hologram B is further recorded in the region in which the hologram A has been recorded as is shown in FIG. 2B. Referring to FIG. 2B, a signal light beam S1b and the reference beam R1 are irradiated to the recording medium HM using the same method as above (the two-dimensional information to be recorded may be changed by applying desired modulation by the spatial light modulator 5). The multiplexing recording is enabled by making the incident angle of the signal light beam S1b with respect to the recording medium HM different from the incident angle of the signal light beam S1a at the time of the recording of the hologram A in this instance.

In this instance, by making the incident angle of the reference beam R1 with respect to the recording medium HM the same as the incident angle at the time of the recording of the hologram A, the reference beam R1 is allowed not only to play a role of the recording reference beam for the hologram B but also to function as the reproducing reference beam for the hologram A. This can be achieved when the incident condition of the recording reference beam (the reference beam R1 in this embodiment) with respect to the recording medium HM and the characteristics of the beam (the in-plane phase distribution, wavelength, and so forth) are almost the same for the recording of the hologram A and the hologram B.

For example, in order to reproduce the information recorded in the hologram A from the recording medium in which the hologram A alone is recorded and holograms are not multiplex-recorded, it is sufficient to irradiate the reproducing reference beam equivalent to the recording reference beam (the reference beam R1 in FIG. 2A) alone to the recording region as in the same manner as the reproduction of a typical monochromatic hologram (a hologram recorded by monochromatic light). In this instance, for example, volume contraction may occur in the hologram recording process depending on the hologram materials. In such a case, the optimal incident angle of the reference beam may possibly differ at the time of recording and at the time of reproduction. However, by understanding the material characteristic, the incident angle can be corrected easily. The reproducing reference beam is diffracted by the recorded hologram and comes out as the reproduced beam at the same angle with respect to the recording medium as the exiting angle of the signal light beam that passed through the recording medium at the time of recording.

It should be noted that the reproducing of a hologram in which an interference fringe is recorded as a thick grating, that is, a so-called Bragg grating, has a limit on the incident angle of the reference beam (referred to as the angle selectivity). In particular, the angle selectivity becomes higher as the recording medium HM becomes thicker (that is to say, the hologram is not reproduced unless the incident angle of the recording reference beam and the incident angle of the reproducing reference beam (the corrected incident angle when a correction of the incident angle as described above is necessary) almost coincide with each other). This is the principle that makes it possible to separate and retrieve the multiplexed two-dimensional information when multiplexing recording and reproduction are carried out.

Hence, according to the hologram multiplexing recording using the method called angle multiplexing or polytopic multiplexing, a plurality of holograms are recorded in the same region by changing the incident angle of the recording reference beam (corresponding to the reference beam R1 in FIG. 2A and FIG. 2B of this embodiment) with respect to the recording medium HM during the recording. Regarding the reproduction, a desired hologram can be reproduced by changing the incident angle of the reproducing reference beam so as to correspond to the incident angle at the time of recording.

As has been described, in order to reproduce the hologram A, it is necessary to irradiate the reproducing reference beam equivalent to the one used when recording the hologram A. Also, it has been described that only a part of the recording reference beam for the hologram B contributes to the recording and the rest passes through the recording medium HM. Accordingly, the light energy of the reference beam R1 that does not contribute to the recording of the hologram B is allowed to go incident on the hologram A as the reproducing reference beam, diffracted by the hologram A, and comes out from the recording medium HM as the reproduced beam D1. The image of the reproduced beam D1 is formed on the light detection surface (also referred to as the light receiving surface) of the two-dimensional image capturing portion 10 by the reproduction optical system 11. The reproduced beam D1 can be thus obtained as the two-dimensional information in the two-dimensional image capturing portion 10.

In this embodiment, as the moving direction of the signal light beam, the optical axis of the signal light beam is rotated, as is indicated by an arrow SD1, in the shape of a circular arc about the intersection of the optical axis of the signal light beam S1a and the optical axis of the reference beam R1 within the plane defined by the optical axis of the signal light beam S1a and the optical axis of the reference beam R1. It should be appreciated, however, that the invention is not limited to this example. The signal light beam may move in the direction indicated by an arrow SD2, which is the direction crossing the plane defined by the optical axis of the signal light beam S1a and the optical axis of the reference beam R1 (for example, a direction orthogonal to the sheet surface of FIG. 2B) as is indicated by an alternate long and short dash line in FIG. 2B. In this case, because the movable range can be wider, it is possible to record a large number of holograms in the same region of the hologram recording medium, which can consequently increase the multiplicity. The same applies to the moving directions of the reference bream and the reproduced beam.

The points of the invention can be summarized as follows. The first point is that the invention is the hologram recording/reproducing method by which hologram multiplexing recording is carried out for different pieces of two-dimensional information by changing the incident angle of the reference beam R1 with respect to the recording medium HM in the same manner as in conventionally proposed angle multiplexing when a plurality of holograms are multiplex-recorded in the same region, and a part of hologram multiplexing recording is achieved by changing the conditions (the incident angles of the signal light beams S1a and S1b with respect to the recording medium HM in this embodiment) of the signal light beam instead of those of the reference beam R1. The second point is that the signal light beam S2b passing through the recording medium HM or the reproduced signal of the hologram B is not obtained while the hologram B is recorded, and instead, the reproduced beam D1 from another hologram A (the hologram that has been recorded in the recording medium HM before the hologram B is recorded) to be reproduced by the reference beam R1 is obtained by the reproduction optical system 11 and the two-dimensional image acquiring portion 10.

Descriptions will now be given to distinct differences of the methods and effects from the DRWA function proposed in Patent Document 5 (Japanese Patent No. 3652338) as means for checking (or verifying) the information to be recorded using the two-dimensional information reproduced simultaneously with or immediately after the hologram recording. The DRAW function is a method of obtaining the reproduced beam from an arbitrary hologram that is being recorded using the reference beam used for the recording as the reproducing reference beam during the recording of this hologram.

According to the description about the DRAW function in Patent Document 5 (Japanese Patent No. 3562338), when the recording of the interference pattern into the hologram layer is started, a reproduced beam is generated from a spot where the interference pattern is recorded by the recording reference beam. It is also described that it is possible to reproduce the recorded information by allowing this reproduced beam to go incident on a CCD array so as to be detected. In addition, it is also described that it can be understood that when the reproduced beam is observed as the output level of the CCD, the intensity of the reproduced beam increases gradually in accordance with the degree of the recording of the interference patterns in the recording medium after the recording of the information is started until it reaches the maximum value at a given time, after which it decreases gradually, which consequently makes it possible to form an interference pattern (that is, to record a hologram) having desired diffraction efficiency by stopping the recording at a point in time when a desired CCD output is obtained.

In contrast, according to the hologram recording/reproducing method of this embodiment, a reproduced beam from a hologram being recorded (for example, the hologram B) is not obtained, but another hologram (for example, the hologram A) already recorded in the same region is reproduced simultaneously with the hologram recording or within the light irradiation time for the hologram recording using the reference beam to record an arbitrary hologram (for example, the hologram B).

The reproduction of the hologram referred to herein is defined, as is described in the example above, to form an image of a reproduced beam (a beam coming out from the recording medium HM at an exiting angle different from that of the transmitted beam S2b) coming out from the recording medium HM as the diffracted beam D1 after being diffracted by the hologram A already recorded in the recording medium HM when the signal light beam S1b and the reference beam R1 to record the hologram B are irradiated to the recording medium HM on the light detection surface of the two-dimensional image capturing portion 10, for example, a CCD or a CMOS sensor, by the reproduction optical system 11, so that it is obtained as the two-dimensional information in the two-dimensional image capturing portion 10.

Incidentally, in the hologram recording using a typical hologram material, for example, a photopolymer material, it is thought that a hologram is recorded using a difference of the refractive indices between polymers formed by letting monomers undergo polymerization by irradiation of light and a matrix material or a material called a binder.

When these materials are used as the recording medium, a substance called a reaction retardant, a pigment to increase the sensitivity to the light wavelength for recording, and so forth are included so that a reaction will not be triggered by slightest unwanted light (for example, stray light). Accordingly, in practice, after light energy containing interference pattern information is irradiated to the recording medium, the hologram material follows the processes: absorption of light →polymerization →diffusion and fixation. It is known that a certain time is required until this sequence of interference pattern formation (hereinafter, also referred to as the hologram formation) by a chemical or structural change ends.

Also, depending on material components adopted, there is a case where the interference pattern forming process described above progresses, for example, after irradiation of a signal light beam and a reference beam to record a hologram ends (generally referred to as a dark reaction). The interference pattern forming time including the absence or presence and the scale of the dark reaction depends on a distribution ratio of the material components by taking the intended fundamental capabilities of the recording medium into account. It is therefore possible to shorten the forming time by a material design process, for example, to increase the material sensitivity and a diffusion rate. It is, however, necessary to take into account the other characteristics of a recording medium (to suppress the occurrence of contraction, to improve the control of the diffraction efficiency for each hologram, and so forth) having the capability of multiplexing recording with the aim of achieving a large capacity storage.

The hologram recoding materials proposed conventionally have a limit in shortening the interference pattern forming time as described above, and it can be said that the interference pattern forming time takes a longer time than the irradiation time of the recording reference beam and the signal light beam. The interference pattern forming time is longer than the light irradiation time also in many of the materials that have been studied and developed as other hologram recording materials, such as organic photorefractive materials and ferroelectric liquid crystal materials, because the interference pattern is formed (that is, the hologram is recorded) by utilizing a chemical or structural change triggered by irradiation of the reference beam and the signal light beam.

A performance index called an M number (hereinafter, expressed by M/#) is used for the hologram recording materials, such as the photopolymers as described above. M/# is proportional to the square root of the diffraction efficiency (not expressed in percentage but by a value representing a ratio of a diffracted beam with respect to an incident beam), and it is an amount proportional to a change of the refractive index. A total of diffraction efficiency becomes higher as M/# becomes larger. A value obtained by dividing M/# by the minimum diffraction efficiency required at the time of reproduction is the feasible multiplicity as a material capability. Accordingly, the feasible multiplicity, that is, a recording capacity can be determined by the multiplicity limit that depends on the recording materials.

It is thought to be difficult for such a recording medium to conduct verification by reproducing the information while a hologram is recorded with the use of the conventional DRAW function. More specifically, in a case where a hologram is reproduced during or immediately after the recording using the DRAW function, a reproduced image can be obtained when the diffraction efficiency, which increases gradually, reaches a desired value. However, there is a time lag resulting from the dark reaction described above between the irradiation of a recording beam and the formation of a hologram.

Hence, in order to obtain a desired reproduced image, it becomes necessary to irradiate energy larger than the light energy (=irradiation intensity×time) required originally to record a hologram having desired diffraction efficiency, for example, by taking the process of irradiating the reference beam and the signal light beam and the process of irradiating the reference beam alone by blocking the signal light beam.

Consequently, in a case where the photopolymer material as described above is used as the recording medium, monomers that are supposed to be used to multiplex-record a plurality of holograms in an arbitrary region of the recording medium are consumed. To be more concrete, a case will be discussed where 1:1 is given as the intensity ratio of the reference beam and the signal light beam as the recording light and a plurality of holograms having diffraction efficiency of 0.1% (that is, the intensity of the diffracted beam with respect to the intensity of an incident beam is 0.001) are multiplex-recorded, then reproduction and verification are conducted immediately after each hologram is recorded with the use of the DRAW function described above. Herein, assume that the recording medium has a recordable capacity (M/#=1000×sqrt(0.001)=31.62278) large enough to multiplex 1000 holograms each having the diffraction efficiency of 0.1%.

In order to conduct verification to check whether the information is recorded correctly, a sufficient light amount is required as a reproduced signal. For example, when a light amount is detected by a CCD, a light amount is low (a diffracted beam is small) when the light amount is obtained in a time zone during the hologram recording in which the diffraction efficiency is increasing gradually as described above. Hence, a signal-to-noise ratio (abbreviated as SNR) of the obtained reproduced beam pattern is so poor and insufficient to check the data. Accordingly, in order to obtain the intensity of a reproduced beam high enough to obtain a sufficient SNR for verification, it is necessary to irradiate the reference beam in a time zone in which the diffraction efficiency is 0.1% for at least an accumulative time to enable the detection by a CCD. By taking these requirements into account, it is essentially necessary to irradiate light energy larger than at least the irradiation light energy of the reference beam and the signal light beam for recording.

In this instance, because the diffraction efficiency increases in proportion to the square of an increase rate of irradiation light energy, for example, in a case where a reproduced beam is obtained by irradiating light energy 1.1 times larger than the light energy that is originally required for the recording by blocking the signal light beam alone after the irradiation of the reference beam and the signal light beam for recording ends, the diffraction efficiency per hologram is found to be $(1.1)^2=1.21$ times larger. In the case described above, the diffraction efficiency is found to be 0.121% (the intensity of a diffracted beam with respect to the intensity of an incident beam is 0.00121), and the multiplicity is found to be about 909 according to a trial calculation by dividing M/#=31.62278 by {sqrt(0.00121)}. That is to say, the number of multiplexing recording feasible in the same region is reduced from 1000 times to about 909 times, which is a reduction as large as about ten percent of the storable capacity of the hologram recording medium.

On the contrary, according to the method described in this embodiment, a hologram is reproduced simultaneously when another hologram is recorded. Hence, the recording process itself is also the reproduction process. Because verification is conducted by obtaining a reproduced beam in the reproduction process, there is an advantage that monomers are not consumed unnecessarily.

In addition, the recording/reproducing method of the invention can be also applied to a recoding medium like the photopolymer material having a dark reaction as described above, and this recording/reproducing method is extremely effective because verification is conducted while preventing unnecessary consumption of monomers as described above. There is no need to multiplex-record holograms continuously in the same region. For example, after holograms are recorded in a plurality of regions of the recording medium one in each region (for example, after the time during which a hologram is formed in a region to which the recording reference beam and the signal light beam are irradiated first), it is possible to reproduce the first hologram again simultaneously when a second hologram is recorded from the first recoding region. In other words, by adopting the hologram recording/reproducing method of the invention, even in a case where the multiplexing recording is carried out in the hologram material in which a dark reaction or the like is present, there is an effect that the recorded data can be checked efficiently by reducing a stand-by time from recording to verification.

To be more concrete, by using the checking portion 15 or the like shown in FIG. 1 in addition to the configuration described above, it is possible to check the recorded information. For example, the configuration may include the data accumulation portion 14 serving as a buffer memory that accumulates information to be recorded (alternatively, an encoder may be separately provided and it may be information encoded to a modulation pattern to be sent to the spatial light modulator 5), the data reproduction portion 16 serving as a buffer memory that accumulates an output of the two-dimensional image capturing portion 10 acquired by obtaining a reproduced beam (alternatively, a decoder may be separately provided and it may be decoded information), and the checking portion 15 serving as an information comparison portion that compares the two types of data and outputs the comparison result. For example, by outputting the comparison result to the controller 21 serving as a device control portion, it becomes possible to control the device operations, such as error corrections and continuation of the recording.

Also, this embodiment described the function and the effect in a case where two holograms (a hologram A and a hologram B) are sequentially recorded and the hologram A is reproduced simultaneously when the hologram B is recorded by way of example. However, regarding the location of the two-dimensional image capturing portion, it is also possible to configure in such a manner that the drive portion 12 is enabled to control the location of the two-dimensional image capturing portion 10 as the drive portion 12 acquires the information about the incident angle of the recording signal light beam with respect to the recording medium HM from the controller 21.

Figure 3:
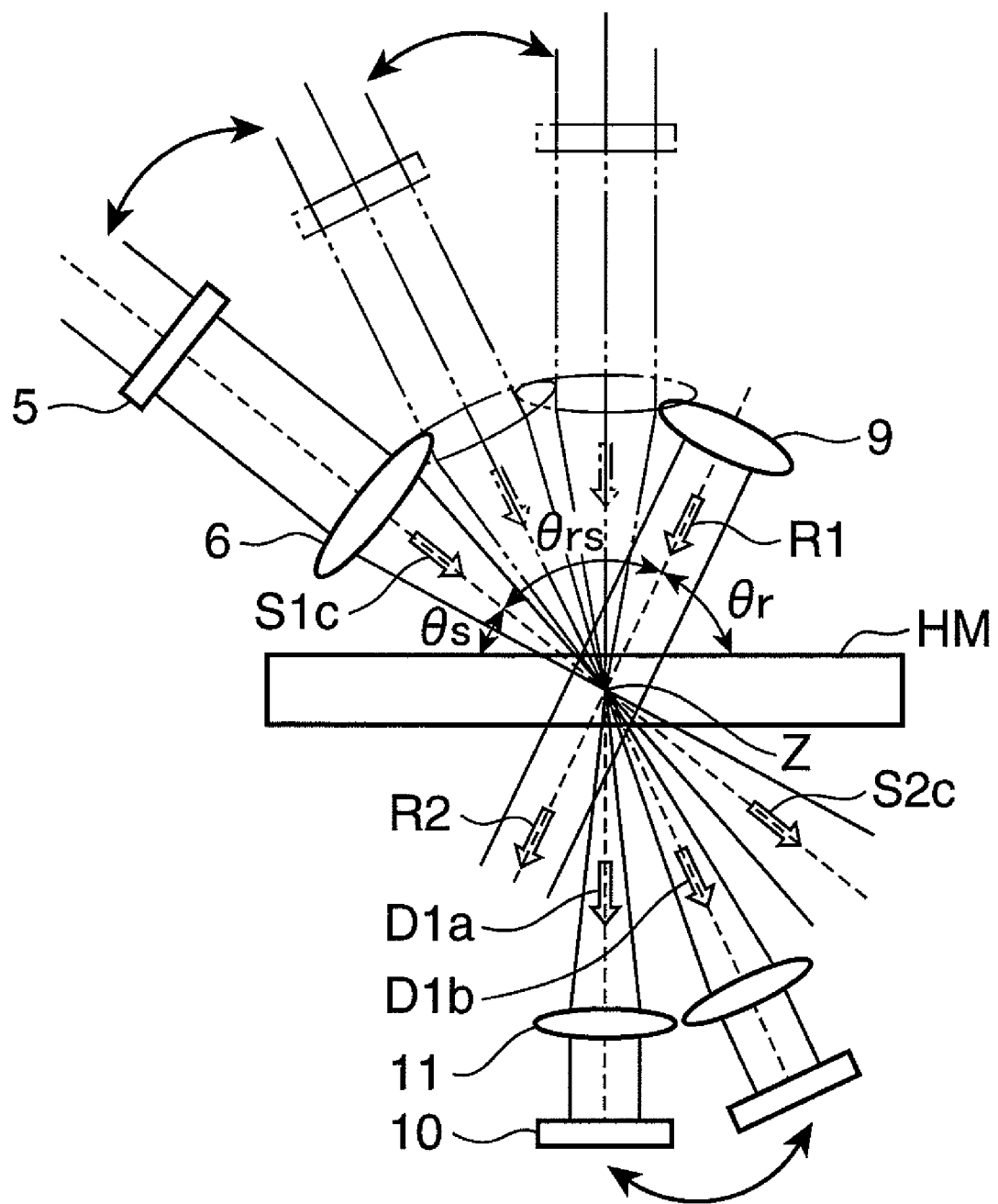
FIG. 3 is a schematic view showing an example of the configuration when another hologram among a plurality of other holograms is reproduced while an arbitrary hologram is recoded during angle multiplexing recording in the first embodiment.

For example, FIG. 3 shows a case where a hologram A is reproduced while a hologram C is recorded. By adopting the configuration as shown in FIG. 3, in a case where three holograms, holograms A, B, and C, are recorded in order of A, B, and C, it is possible to reproduce the hologram A, which is two holograms earlier, while the hologram C is recorded by locating the two-dimensional image capturing portion 10 in the exiting direction of the reproduced beam of the hologram A.

Referring to FIG. 3, HM denotes a recording medium in which holograms are recorded, numeral 5 denotes the spatial light modulator that forms two-dimensional information to be recorded, S1c denotes a signal light beam containing the two-dimensional information formed in the spatial light modulator 5, numeral 6 denotes the signal light beam irradiation optical system that irradiates the signal light beam S1c to a desired region of the recording medium HM, R1 denotes a reference beam emitted from the same light source as the signal light beam, numeral 9 denotes the reference beam irradiation optical system that irradiates the reference beam R1 to the desired region of the recording medium HM, R2 denotes a reference beam passing through the recording medium HM, S2c denotes a signal light beam passing through the recording medium HM, D1a and D1b denote reproduced beams diffracted, respectively, by the hologram A and the hologram B already recorded in the recording medium HM by irradiating the reference beam R1 to the recording medium HM, numeral 10 denotes the two-dimensional image capturing portion that detects and obtains either the reproduced beam D1a or D1b, and numeral 11 denotes the reproduction optical system that forms an image of either the reproduced beam D1a or D1b on the two-dimensional image capturing portion 10.

The basic functions of this configuration are the same as those described using FIG. 1 and FIG. 2. However, for example, let $\theta_{rs}$ be the angle of the recording signal light beam S1c with respect to the reference beam R1, and $\theta_{rs}$ at the time of the recording of the hologram A and the hologram B or a difference ($\Delta\theta_{rs}$) of $\theta_{rs}$ from one hologram to another is detected or determined in advance. Then, by locating the two-dimensional image capturing portion 10 and the reproduction optical system 11 to a desired position by mechanical movement by means of the drive portion 12, it becomes possible to reproduce the two-dimensional image from an arbitrary hologram, which is either the hologram A or the hologram B, and to verify the data using the reproduced information. To be more concrete, the drive portion 12 is formed of a rotary mechanism, such as a stepping motor, and rotates the two-dimensional image capturing portion 10 and the reproduction optical system 11 integrally about the intersection Z of the optical axis of the signal light beam and the optical axis of the reference beam as the rotation center. By locating the two-dimensional image capturing portion 10 and the reproduction optical system 11 to a desired position by this rotational movement, it becomes possible to verity the data.

Three holograms are described herein by way of example. However, the same effect can be achieved even in a case where a larger number of holograms are multiplex-recorded. In addition, by preparing a plurality of reproduction optical systems and two-dimensional image capturing portions and locating these components so as to correspond to a plurality of holograms to be reproduced, it is also possible to reproduce the holograms A and B simultaneously while the hologram C is recorded. Also, by providing a plurality of reproduction optical systems and two-dimensional image capturing portions, for example, there can be achieved an effect that information is reproduced at a high transfer rate by making it possible to reproduce a plurality of holograms by a single reference beam after all the operations involved in the multiplexing recording and the verification end.

For ease of understanding of the invention, this embodiment described a method of reproducing another hologram simultaneously when an arbitrary hologram is recorded in the case of recording a plurality of holograms by changing the incident angle of the signal light beam while fixing the incident angle of the reference beam with respect to the recording medium HM. However, for example, as is detailed in FIG. 4, after a plural holograms are recorded and reproduced by changing the incident angle of the signal light beam with respect to the recording medium HM while the incident angle of the reference beam is maintained at $\theta_{rN}$ in the method above, it is possible to perform the method above by changing the incident angle of the reference beam with respect to the recording medium HM by $\Delta\theta_r$ to be fixed at $\theta_{r(N+1)}$ and changing the incident angle of the signal light beam further in the same region.

Figure 4:
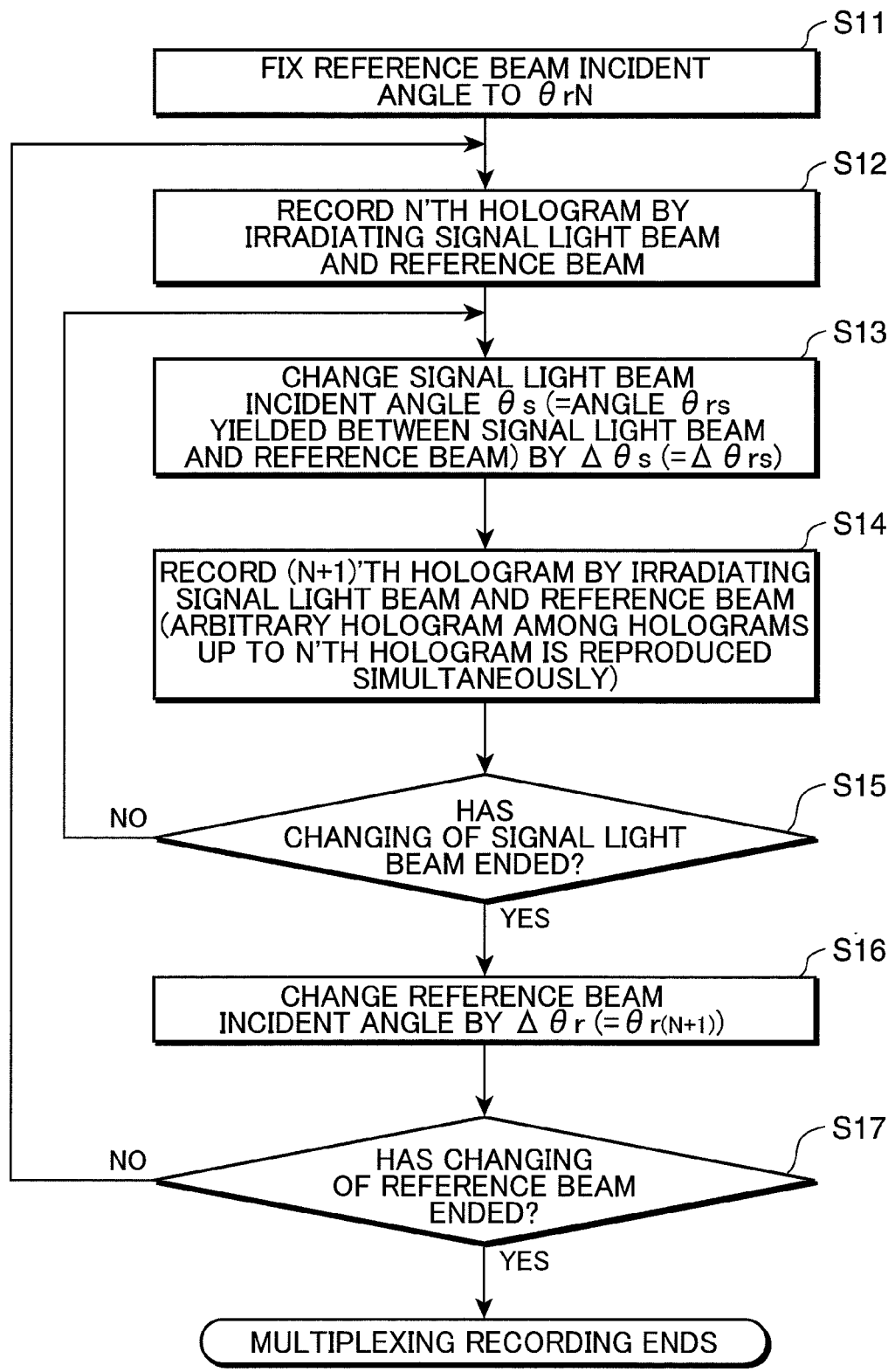
FIG. 4 is a flowchart detailing an example of the sequence of a hologram multiplexing recording/reproducing method in the first embodiment.

To be more concrete, as is detailed in FIG. 4, the incident angle of the reference beam is fixed to $\theta_{rN}$ first (Step S11), and an N'th hologram is recorded by irradiating the signal light beam and the reference beam (Step S12). Subsequently, the incident angle of the signal light beam (the angle $\theta_{rs}$ yielded between the signal light beam and the reference beam), $\theta_s$, is changed by $\Delta\theta_s$ ($\Delta\theta_{rs}$) (Step S13), after which an (N+1)'th hologram is recorded by irradiating the signal light beam and the reference beam and an arbitrary hologram among holograms up to the N'th hologram is reproduced simultaneously (Step S14).

Subsequently, whether the changing of the incident angle of the signal light beam has ended is determined (Step S15). In a case where the changing of the incident angle of the signal light beam has not ended, processing in Steps S13 and S14 is repeated. In a case where the changing of the incident angle of the signal light beam has ended, the flow proceeds to the processing in Step S16.

In a case where the changing of the incident angle of the signal light beam has ended, the incident angle of the reference beam is changed by $\Delta\theta_r$ to fix the incident angle of the reference beam to $\theta_{r(N+1)}$ (Step S16). Thereafter, whether the changing of the incident angle of the reference beam has ended is determined (Step S17). In a case where the changing of the incident angle of the reference beam has not ended, the processing in and after Step S12 is repeated. In a case where the changing of the incident angle of the reference beam has ended, the multiplexing recording is ended.

The incident angle of the reference beam is changed by the drive portion 20. As the drive portion 20, a known movement mechanism that changes the incident angle of the reference beam can be used. For example, as with a change of the incident angle of the signal light beam, the incident angle of the reference beam can be changed using a movable mirror, a drive circuit, and so forth.

As has been described, by appropriately selecting a change amount of the incident angle of the reference beam, $(\theta_{r(N+1)} - \theta_{rN})$, with the use of the angle selectivity in the hologram reproduction by irradiation of the reference beam, a hologram recorded by the reference beam at $\theta_{rN}$ will not be reproduced by the reference beam at $\theta_{r(N+1)}$. By repeating this process, it is possible to multiplex-record several hundreds to several thousands of holograms in an arbitrary region of the recording medium, which consequently makes it possible to achieve a large-capacity information recording device. In this case, too, it is possible to reproduce another recorded hologram using the reference beam same as the recording reference beam and to verify the data using the reproduced information simultaneously when an arbitrary hologram is recorded. It is thus possible to achieve the effect that information can be recorded and reproduced at a high transfer rate.

Figure 5:
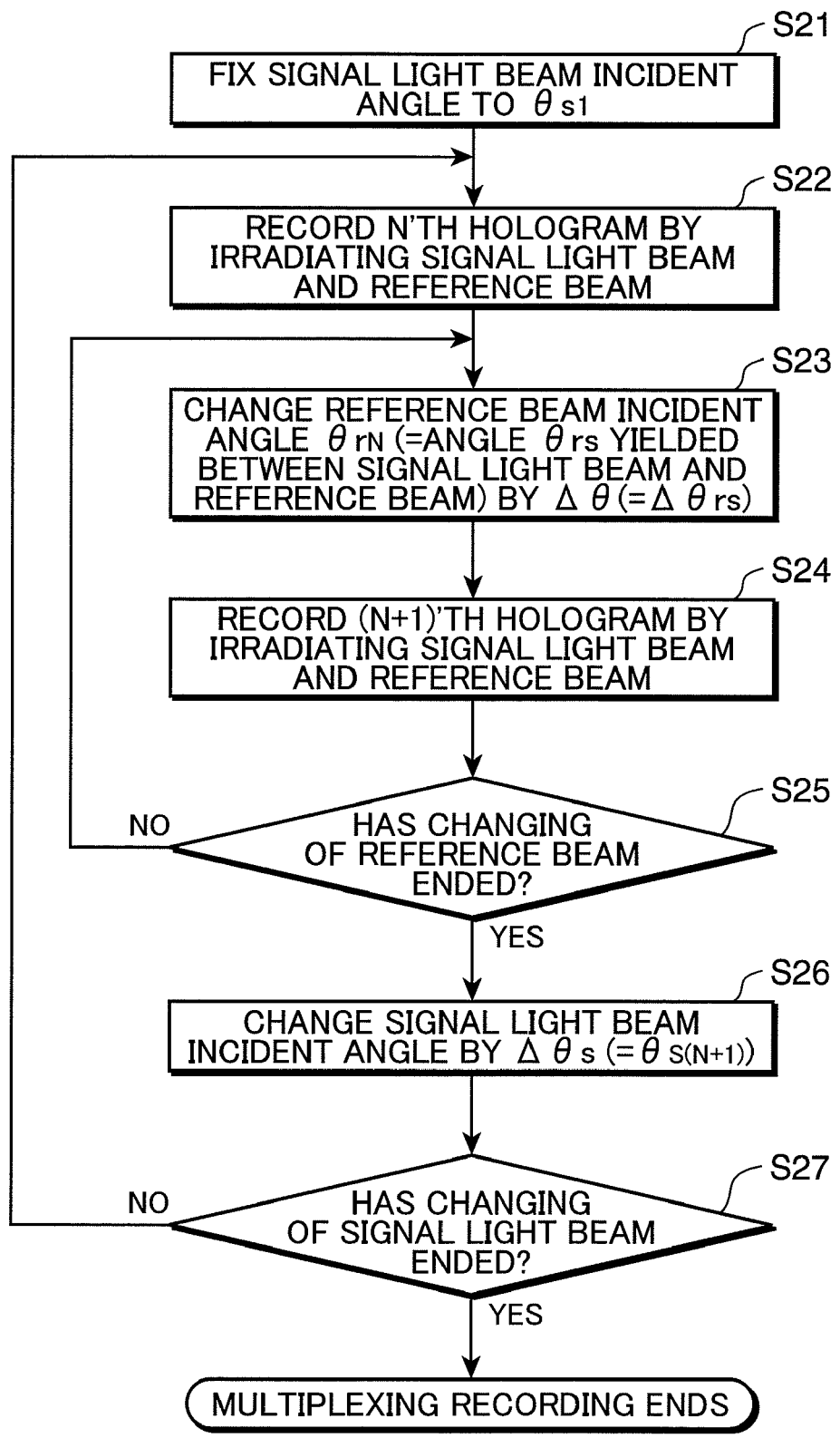
FIG. 5 is a flowchart detailing an example of the sequence of another hologram multiplexing recording/reproducing method in the first embodiment.

Also, as is detailed in FIG. 5, it is possible to record a group of a plurality of holograms A first by changing the incident angle of the reference beam with respect to the incident angle of an arbitrary signal light beam, $\theta_{s1}$, from $\theta_{rN}$ to $\theta_{rN}+m\times\Delta\theta$ (m is a natural number), and then to record another group of a plurality of holograms B by changing the incident angle of the reference beam in the same manner after the incident angle of the signal light beam is changed to $\theta_{s2}$ ($=\theta_{s1}+\Delta\theta_s$).

As is detailed in FIG. 5, the incident angle of the signal light beam is initially fixed to $\theta_{s1}$ (Step S21), and then an N'th hologram is recorded by irradiating the signal light beam and the reference beam (Step S22). Subsequently, the incident angle of the reference beam (the angle $\theta_{rs}$ yielded between the signal light beam and the reference beam), $\theta_{rN}$, is changed by $\Delta\theta$ ($\Delta\theta_{rs}$) (Step S23), after which an (N+1)'th hologram is recorded by irradiating the signal light beam and the reference beam (in a case where the incident angle of the signal light beam is changed in Step S26, an arbitrary hologram among holograms up to the N'th hologram is reproduced simultaneously) (Step S24).

Subsequently, whether the changing of the incident angle of the reference beam has ended is determined (Step S25). In a case where the changing of the incident angle of the reference beam has not ended, the processing in Steps S23 and S24 is repeated. In a case where the changing of the incident angle of the reference beam has ended, the flow proceeds to the processing in Step S26.

In a case where the changing of the incident angle of the reference beam has ended, the incident angle of the signal light beam is changed by $\Delta\theta_s$ so as to fix the incident angle of the signal light beam to $\theta_{s(N+1)}$ (Step S26). Thereafter, whether the changing of the incident angle of the signal light beam has ended is determined (Step S27). In a case where the changing of the incident angle of the signal light beam has not ended, the processing in and after Step S22 is repeated. In a case where the changing of the incident angle of the signal light beam has ended, the multiplexing recording is ended.

Referring to FIG. 5, for example, a loop 1 to return to Step S23 as the determination result in Step S25 is "NO" corresponds to the recording process of a group of holograms A, and a loop 2 to return to Step S22 as the determination result in Step S27 is "NO" corresponds to a process to reproduce the group of holograms A simultaneously when a group of holograms B are recorded.

Figure 6A:
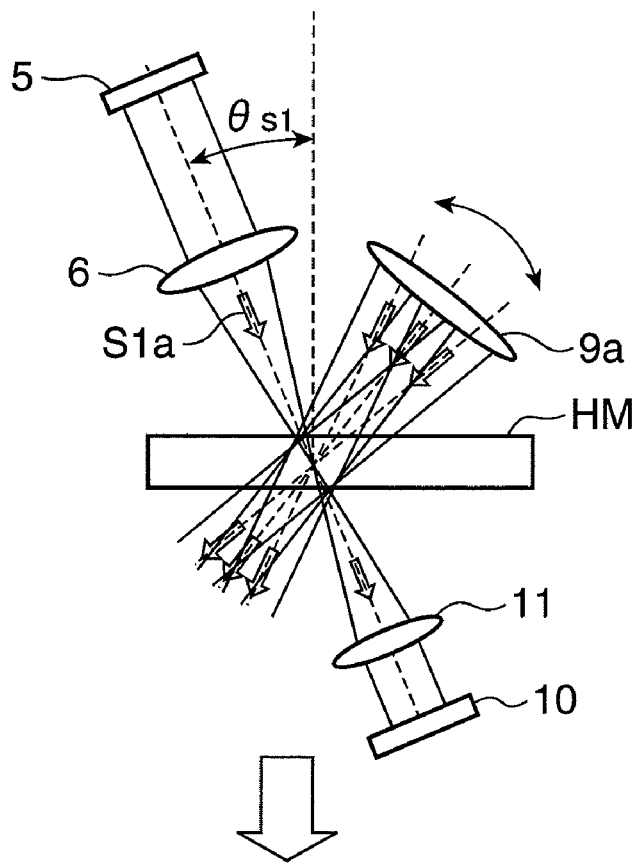
FIG. 6A is a view schematically showing the configuration to multiplex-record a group of holograms A in an arbitrary region of a hologram recording medium by changing the incident angle of a reference beam as an example of the hologram recording/reproducing method in the first embodiment.
Figure 6B:
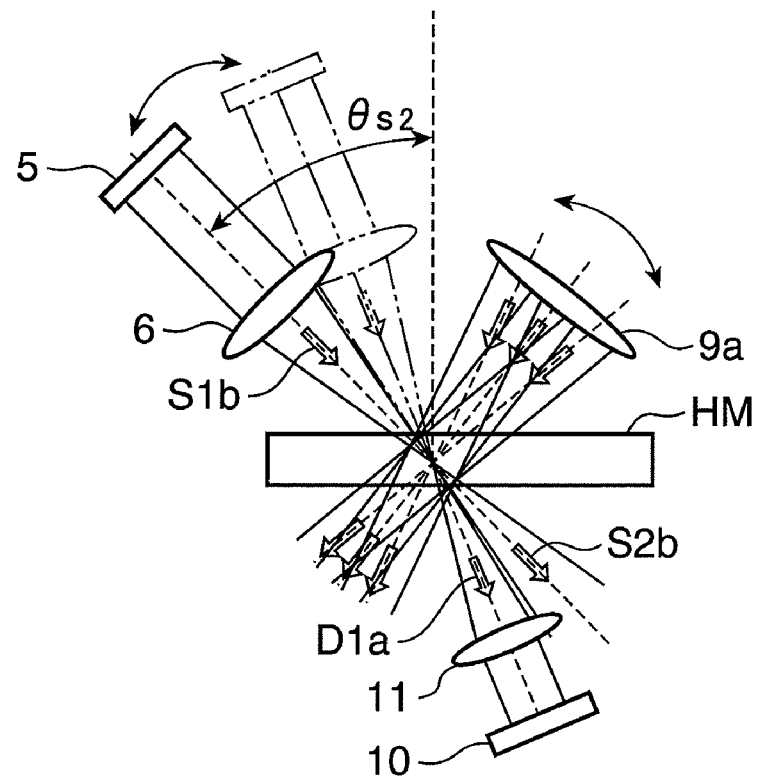
FIG. 6B is a schematic view showing an example of the configuration to reproduce the group of holograms A already recorded in the same region simultaneously when a group of hologram B are recorded in the first embodiment.

The arrangement of the optical systems and the recording operations in this instance are schematically shown in FIG. 6A and FIG. 6B. FIG. 6A is a view schematically showing a case where a group of a plurality of holograms A are recorded by changing the irradiation angle of the reference beam while the incident angle of the signal light beam is $\theta_{s1}$. FIG. 6B is a view schematically showing a case where a group of a plurality of holograms B are recorded by changing the irradiation angle of the reference beam after the incident angle of the signal light beam is changed to $\theta_{s2}$, which is different from $\theta_{s1}$.

As is shown in FIG. 6A, after a group of a plurality of holograms A are recorded by changing the irradiation angle of the reference beam while the incident angle of the signal light beam is $\theta_{s1}$, as is shown in FIG. 6B, it is possible to obtain reproduced beams from the group of holograms A simultaneously when a group of holograms B are recorded by setting the incident angle of the reference beam when recording the group of holograms A and the incident angle of the reference beam when recording the group of holograms B as well as a change amount to be the same.

This embodiment described a case where the already recorded hologram A is reproduced simultaneously when the hologram B is recorded by way of example. It is, however, possible to achieve another effect by obtaining a reproduced beam not as a beam having the two-dimensional image information but as a diffracted beam by the hologram to obtain the intensity of the diffracted beam.

In a case where the reproduction optical system and the two-dimensional image capturing portion 10 formed of a CCD, a CMOS sensor, or the like are used as with the configuration described in this embodiment, it is easy to obtain the diffracted beam as light intensity. Generally, because an imaging device, such as a CCD and a CMOS sensor, is a device that converts the number of photons incident on each pixel to two-dimensional image information through electric conversion, the two-dimensional image information can be readily converted to the intensity of the diffracted beam through a simple computation using the light receiving area and a voltage value or a current value of the output. The method of obtaining the intensity of the diffracted beam is not particularly limited to the above example. In order to obtain a beam diffracted by the hologram A as the light intensity simultaneously when the hologram B is recorded, for example, a photo detection device, such as a power meter and a photo detector (PD), may be disposed, so that the diffracted beam is retrieved by the photo detection device, either partially or entirely.

By obtaining the intensity of the diffracted beam of the hologram A by either method described above, it is possible to calculate the recording sensitivity of the recording medium HM when the hologram A was recorded. The recording sensitivity (represented by X herein) referred to herein is a value obtained from integral recording energy until the recording of the hologram A is completed (integral light exposure energy density: D) and diffracted efficiency η of the hologram A (=diffracted beam power÷incident reference beam power, a dimensionless number). It is generally expressed by the following formula (herein, √ denotes a square root):

$$X=\sqrt{(\eta)} \div D \text{ (unit: cm}^2\text{/mJ).}$$

Alternatively, when normalized by the thickness of the recording medium, T, it can be expressed by the following formula:

$$X=\sqrt{(\eta)} \div (D \times T) \text{ (unit: cm/mJ).}$$

Meanwhile, as has been described, in a case where the recording sensitivity of the hologram recording medium changes with the progress of the multiplexing recording, it is necessary to control a light exposure energy amount (that is, an irradiation light amount and an irradiation time) corresponding to the recording sensitivity of the recording medium.

When the diffraction efficiency changes from one hologram to another during the hologram recording and reproduction, there arises an inconvenience that the time necessary for reproduction changes from one hologram to another and the quality (signal-to-noise ratio: SNR) differs markedly among the resulting pieces of two-dimensional image information.

Figure 7:
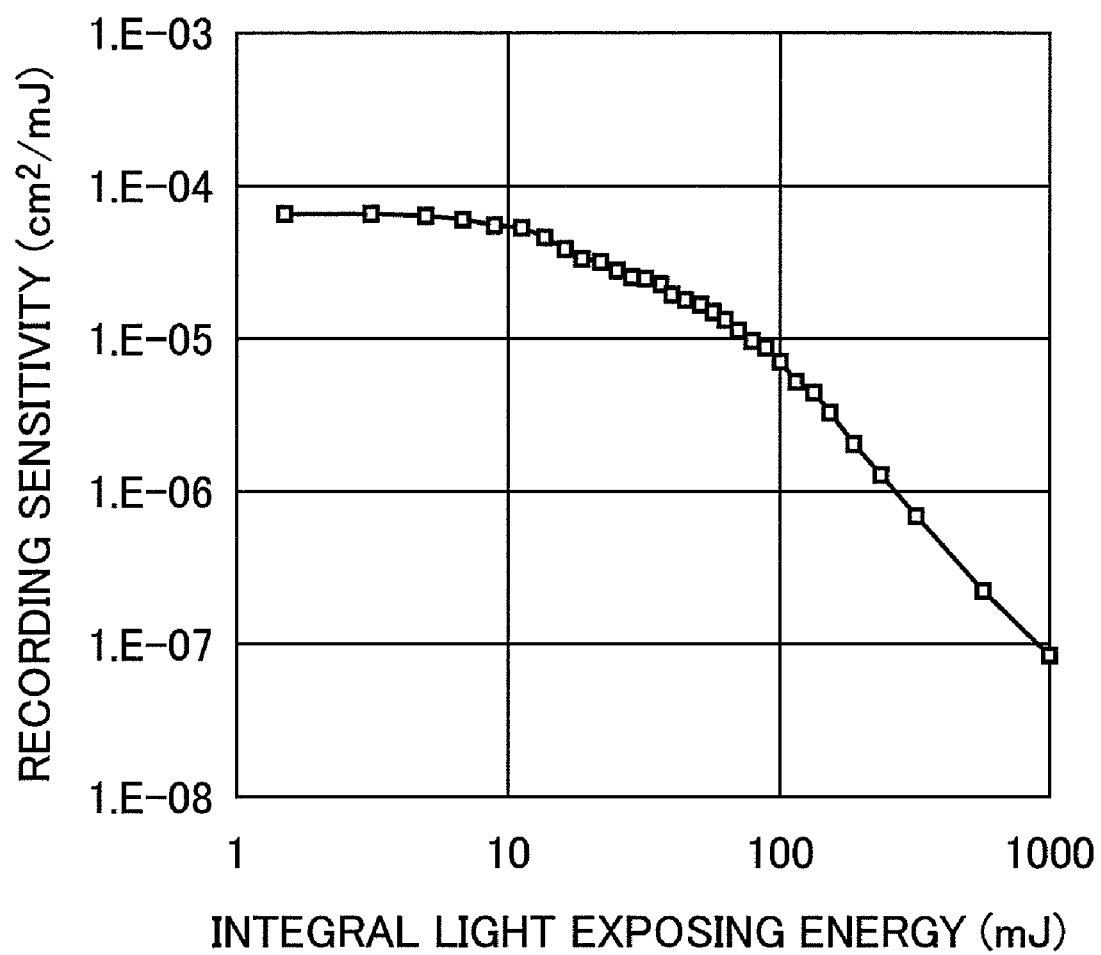
FIG. 7 is a view showing an example of the relation of integral light exposure energy and recording sensitivity during multiplexing recording.

For example, the relation of the integral light exposure energy and a change of the recording sensitivity in the case of the hologram multiplexing recording with the recording medium discussed so far is set forth in FIG. 7. It is understood from FIG. 7 that the recording sensitivity deteriorates as the integral light exposure energy increases. Also, a variance of the diffraction efficiency of the multiplexed holograms when the multiplexing recording is carried out without reflecting a change of the recording sensitivity during the multiplexing recording is set forth in FIG. 8. It is understood from FIG. 8 that the diffraction efficiency of multiplexed holograms varies considerably in a case where the multiplexing recording is carried out without reflecting a change of the recording sensitivity during the multiplexing recording.

Figure 8:
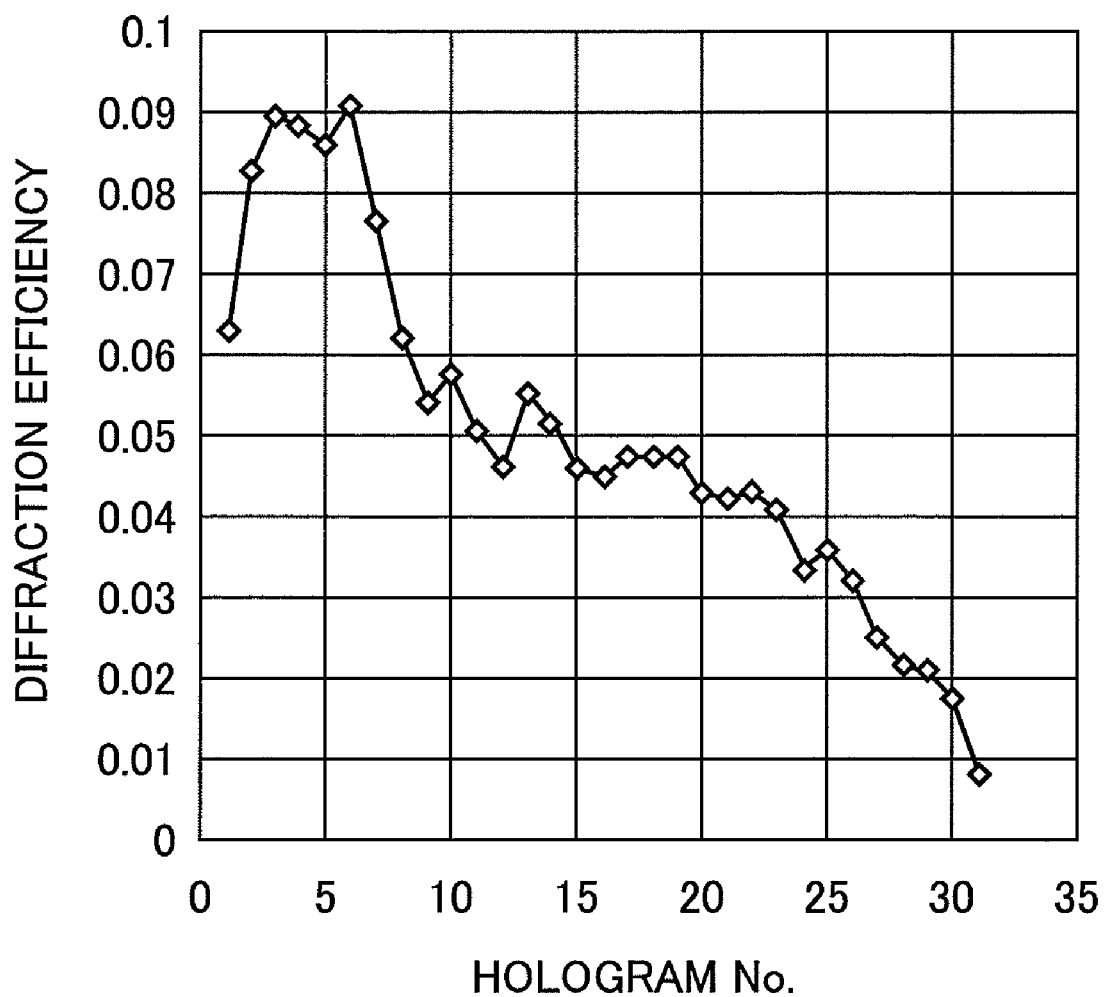
FIG. 8 is a view showing an example of diffraction efficiency for each hologram during multiplexing recording in a case where the recording sensitivity is not monitored.
Figure 9:
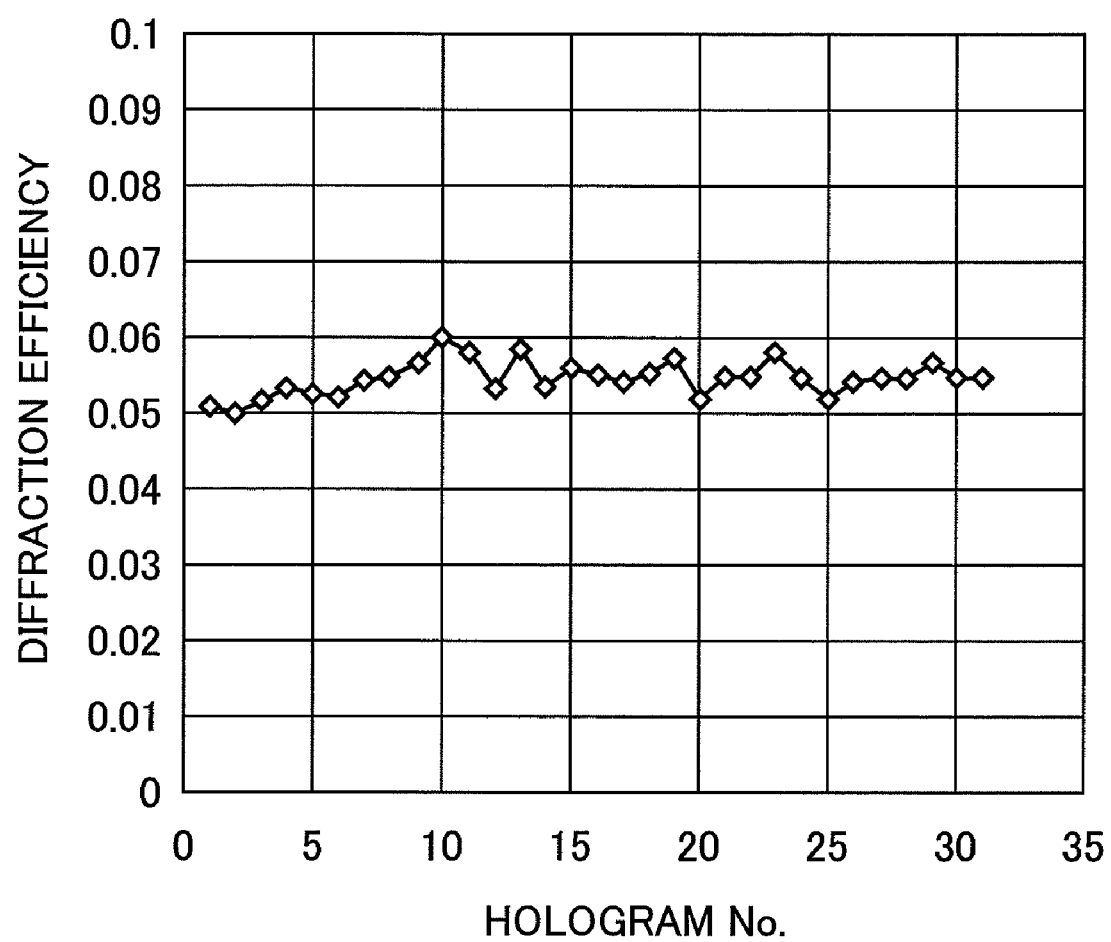
FIG. 9 is a view showing an example of the diffraction efficiency of each hologram during multiplexing recording in a case where the recording sensitivity is monitored in the first embodiment.

In order to suppress a change of the diffraction efficiency from one hologram to another as is shown in FIG. 8, it is necessary to control the hologram recording conditions (the light exposure energy and the irradiation time) for homogenization on the basis of the recording sensitivity before the recording as immediate as possible. Accordingly, in this embodiment, the light amount detection portion 18 receives a voltage representing the two-dimensional information from the two-dimensional image capturing portion 10 and detects a light amount of the diffracted beam from a hologram recorded several holograms earlier using the light receiving area and a voltage value of the output of the two-dimensional image capturing portion 10. The recording sensitivity calculation portion 19 calculates the current recording sensitivity of the hologram recording medium HM from the light amount of the diffracted beam detected by the light amount detection portion 18. The laser drive circuit 17 calculates a recording energy amount needed to obtain desired diffraction efficiency on the basis of the calculated recording sensitivity and controls an output of the laser light source 1 in order to set the optimal recording conditions and correct the scheduling. Consequently, it becomes possible to carry out the multiplexing recording while reflecting a change of the recording sensitivity during the multiplexing recording. Hence, as is shown in FIG. 9, a variance of the diffraction efficiency of the multiplexed holograms can be eliminated almost completely.

As has been described, the points of the invention are that the recording sensitivity in the recording region can be readily obtained in the middle of the multiplexing recording by the method described above, and that it becomes possible to set the optimal recording conditions and correct the scheduling easily by calculating a recording energy amount needed for a hologram to be recorded next to obtain desired diffraction efficiency on the basis of the obtained recording sensitivity. In other words, according to the invention, by obtaining a diffracted beam from a hologram recorded several holograms earlier in the middle of the multiplexing recording in an arbitrary recording region of the recording medium, it is possible to achieve the monitoring of the recording sensitivity in quasi-real time so that a change of the recording sensitivity can be traced and understood. The invention has therefore an advantage that the stability and the reliability of the information recording when recoding and reproducing holograms by multiplexing recording can be significantly enhanced.

Figure 10:
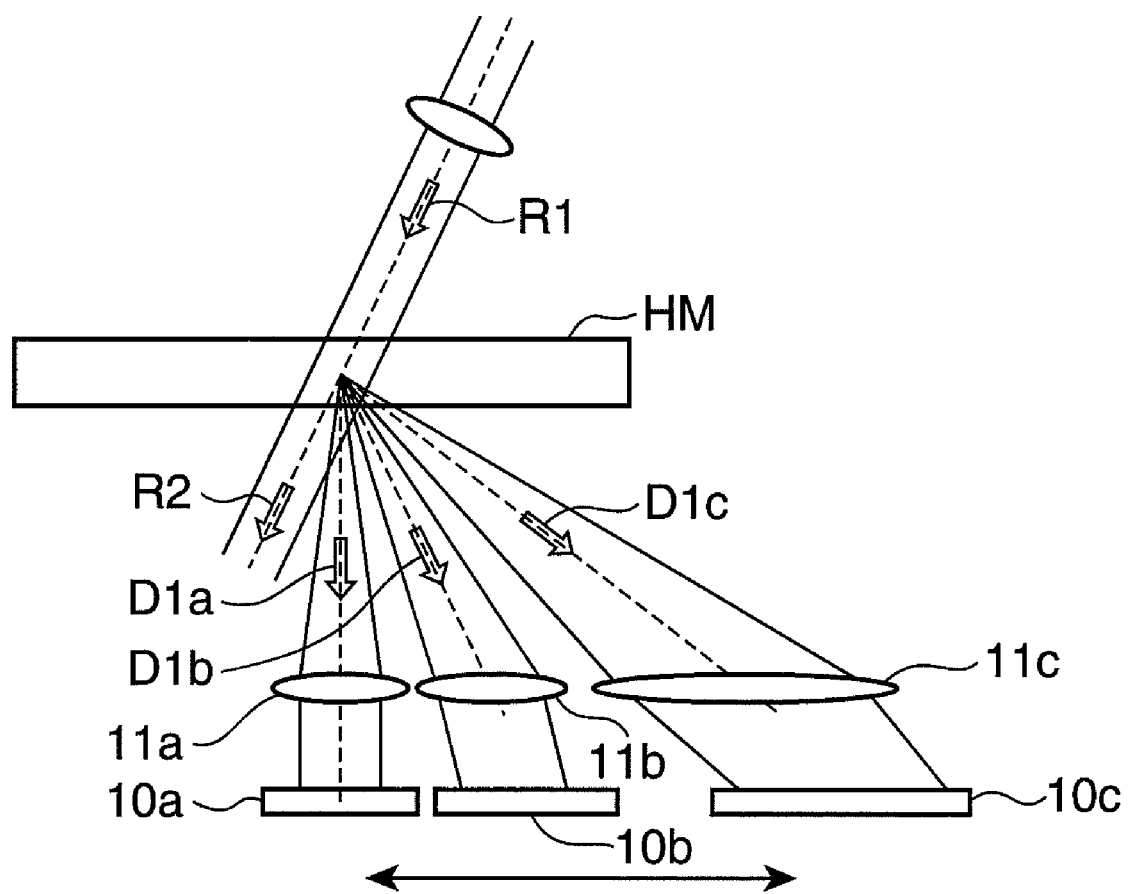
FIG. 10 is a schematic view showing a state where a reproduction optical system and a two-dimensional image capturing portion are moved in parallel while maintaining the positional relation of the reproduction optical system and the two-dimensional image capturing portion.

In a case where an arbitrary hologram is reproduced or in a case where a plurality of holograms are reproduced simultaneously, for example, as is shown in FIG. 10, when the reproduction optical system and the two-dimensional image capturing portion are disposed while maintaining the positional relation of the reproduction optical system and the two-dimensional image capturing portion, it is necessary to dispose a plurality of reproduction optical systems 11a through 11c and two-dimensional image capturing portions 10a and 10c almost in parallel with the recording medium HM. This gives rise to a change of the distance from the hologram to the reproduction optical system and a change of the incident angle of a reproduced beam with respect to the reproduction optical system. Accordingly, there arise inconveniences that an image to be obtained varies in size or undergoes distortion on the light receiving surfaces of the two-dimensional image capturing portions 10a through 10c. This raises a need to correct distortion by adjusting the positional relation of the reproduction optical system and the two-dimensional image capturing portion. In addition, it is necessary to secure a large size for the reproduction optical system and a large light receiving area of the two-dimensional image capturing portion to match the size of a reproduced beam having a large exiting angle. FIG. 10 schematically shows a difference between the size of the reproduction optical system and the size of the two-dimensional image capturing portion necessary to obtain reproduced beams having different exiting angles in the configuration described above.

In order to avoid and prevent these inconveniences, as is shown in FIG. 3 as this embodiment, it is effective to move the two-dimensional image capturing portion 10 and the reproduction optical system 11 in the shape of a circular arc about the intersection Z of the optical axis of the signal light beam and the optical axis of the reference beam, so that the light receiving surfaces of the two-dimensional image capturing portion 10 are disposed at almost equal distances from the intersection Z and to be almost perpendicular to the axes of reproduced beams D1a and D1b of the respective holograms that are imaged in the two-dimensional image capturing portion 10. Accordingly, there can be achieved an effect that the optical positional relation from the respective holograms to the corresponding two-dimensional image capturing portion 10 is maintained, which eliminates deformation and distortion of the image almost completely.

Hence, it is possible to obtain reproduced beams of all the holograms using a single two-dimensional image capturing portion 10 having a light receiving area of a size sufficiently large and necessary to obtain a reproduced beam and a single (one set) reproduction optical system 11 having a bore diameter and a numerical aperture for enabling an image to be formed on the light receiving surface. Also, because the positional relation of the reproduction optical system 11 and the two-dimensional image capturing portion 10 is constant, it is possible to dispose these components as an integral module. Accordingly, it is possible to readily achieve the relation in which the light receiving surfaces are at almost equal distances from the intersection of the optical axis of the signal light beam and the optical axis of the reference beam and almost perpendicular to the optical axis of the reproduced beam of the hologram imaged on the two-dimensional image capturing portion by a mechanical movement.

It should be appreciated that the configurations of the two-dimensional image capturing portion and the reproduction optical system are not particularly limited to those in the example above. It may be configured in such a manner that reproduction beams from two holograms are obtained simultaneously by disposing two two-dimensional image capturing portions 10 and two reproduction optical systems 11 immovably at two points specified in FIG. 3 without moving the two-dimensional image capturing portion and the reproduction optical system, or one or a plurality of holograms are reproduced successively or simultaneously by immovably disposing a plurality of two-dimensional image capturing portions and reproduction optical systems at reproduction positions of the respective holograms, that is, at every position at which reproduction is enabled, in other words, by disposing the respective light receiving surfaces of a plurality of two-dimensional image capturing portions to be at almost equal distances from the intersection of the optical axis of the signal light beam and the optical axis of the reference beam and to be almost perpendicular to the optical axes of the respective diffracted beams from a plurality of holograms.

Figure 11:
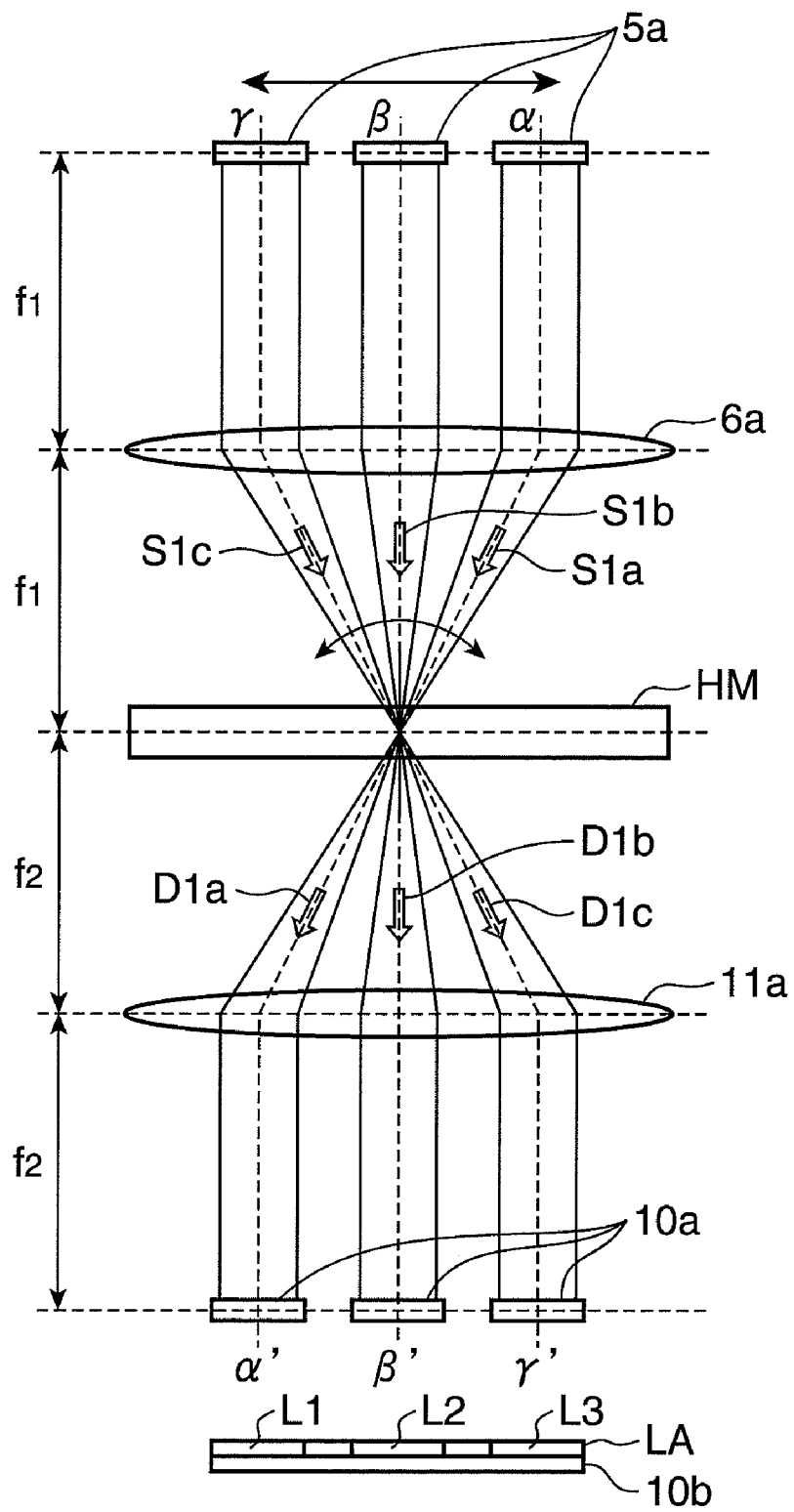
FIG. 11 is view schematically showing an example of the configurations of a spatial light modulator, a signal light beam irradiation optical system, a reproduction optical system, and a two-dimensional image capturing portion adoptable to the first embodiment.

Also, for example, by using a lens having a large numerical aperture and a lens having a large bore diameter as the reproduction optical system, it is possible to obtain reproduced beams of a plurality of holograms exiting from the hologram recording medium at different exiting angles. FIG. 11 shows the configuration in a case where the effect of the invention is achieved using a lens having a large bore diameter as the reproduction optical system. FIG. 11 schematically shows the relation of the spatial light modulator and the signal light beam when a hologram is recorded and the relation of the reproduced beam and the two-dimensional image capturing portion when a hologram is reproduced, and the reference beam when a hologram is recorded and reproduced, the reference beam irradiation optical system that irradiates the reference beam to a desired region of the recording medium, and the reference beam passing through the recording medium are omitted in this drawing.

Referring to FIG. 11, HM denotes a recording medium in which holograms are recorded, 5a denotes three spatial light modulators each of which forms two-dimensional information to be recorded, S1a, S1b, and S1c denote signal light beams containing the two-dimensional information formed by the spatial light modulators 5a, 6a denote a lens forming the signal light beam irradiation optical system that irradiates the signal light beams S1a, S1b, and S1c to a desired region of the recording medium HM, D1a, D1b, and D1c denote reproduced beams, respectively, from a hologram A, a hologram B, and a hologram C recorded in the recording medium HM by irradiating the signal light beams S1a, S1b, and S1c and the reference beam (not shown) to the recording medium HM, 10a denotes CCDs, which are three two-dimensional image capturing portions that detect and obtain any one of the reproduced beams D1a, D1b, and D1c, and 11a denotes a lens forming the reproduction optical system, which is an image forming optical system to form images of the reproduced beams D1a, D1b, and D1c on the corresponding CCDs 10a.

Herein, f1 and f2 shown in FIG. 11 represent focal lengths of the lens 6a and the lens 11a, respectively. As is shown in the drawing, the front focal length and the back focal length are equal for both the lens 6a and the lens 11a. The three spatial light modulators 5a are disposed on the front focal point plane of the lens 6a and the light receiving surfaces of the three CCDs 10a are disposed on the back focal point plane of the lens 11a. In addition, assume that the back focal position of the lens 6a and the front focal position of the lens 11a coincide with each other and the principal surfaces of the lens 6a and the lens 11a are parallel to each other.

Also, in this embodiment, the center plane of the recording medium HM in the thickness direction is disposed at the back focal position of the lens 6a (=the front focal position of the lens 11a). Herein, the relation, f1=f2, may be established. In a case where this relation is established, the area of an exiting beam from the spatial light modulator 5a and the area of an incident beam on the light receiving surface of the CCD 10a are equal (that is to say, a ratio of f1 and f2 is an expansion ratio of the area of the exiting beam from the spatial light modulator 5a and the area of an incident beam on the light receiving surface of the CCD 10a).

Also, positions $\alpha$, $\beta$, and $\gamma$ in FIG. 11 represent the positions of the three spatial light modulators 5a when the signal light beams S1a, S1b, and S1c are formed. The signal light beams S1a, S1b, and S1c are formed by switching light used to form signal light beams to go incident on the respective spatial light modulators 5a while the three spatial light modulators 5a are fixedly disposed at the positions $\alpha$, $\beta$, and $\gamma$. It should be appreciated that the configuration of the spatial light modulators is not particularly limited to the example above. It is also possible to dispose a single spatial light modulator 5a at an arbitrary position by moving the spatial light modulator 5a mechanically in the direction indicated by an arrow in the drawing.

Likewise, positions $\alpha'$, $\beta'$, and $\gamma'$ in FIG. 11 represent the positions of the CCDs 10a when detecting any one of the reproduced beams D1a, D1b, and D1c. By disposing the three CCDs 10a fixedly to the positions $\alpha'$, $\beta'$, and $\gamma'$ and irradiating the reproducing reference beam (not shown), it is possible to obtain reproduced beams corresponding to the respective positions simultaneously or to reproduce desired two-dimensional information. It should be appreciated that the configuration of the two-dimensional image capturing portion is not particularly limited to the example above. A single CCD 10a may be disposed at an arbitrary position by moving the CCD 10a mechanically in the direction indicated by an arrow in the drawing.

The hologram recording when the spatial light modulator 5a is at the position a in this example will be described first. Almost parallel light goes incident on the spatial light modulator 5a and the signal light beam S1a containing two-dimensional information is formed. The signal light beam S1a is irradiated to the recording medium HM by the lens 6a. A hologram (let this hologram be a hologram A) is recorded in the recording medium HM by irradiating a recording reference beam (not shown) from the reference beam irradiation optical system (not shown) to the same region of the recording medium HM to which the signal light beam S1a is irradiated.

As has been described, it is possible to reproduce the hologram A simultaneously with the recording by recording another hologram after the incident angle of the signal light beam is changed. Initially, descriptions will be given to a case where a method of shifting the spatial light modulator 5a (linear parallel movement) is adopted as the method of changing the incident angle of the signal light beam (that is, the optical axis of the signal light beam).

As is shown in FIG. 11, when the spatial light modulator 5a is shifted from the position α to the position β, the incident position of the signal light beam on the lens 6a changes, and the incident angle with respect to the recording medium HM changes consequently. By shifting the spatial light modulator 5a so as to move in parallel within the before focal point plane of the lens 6a in this manner, the irradiation position of the signal light beam S1b, which is a parallel beam before it goes incident on the lens 6a, coincides with the irradiation position of the signal light beam S1a on the back focal point plane of the lens 6a. Accordingly, holograms formed by the reference beam whose incident angle is fixed and the respective signal light beams are angle multiplex-recorded in the same region. Herein, let the hologram formed by the signal light beam S1b and the recording reference beam be a hologram B. By further shifting the spatial light modulator 5a to be disposed at the position γ in the same manner, still another hologram (let this hologram be a hologram C) is multiplex-recorded in the same recording region.

Because the reproduced beam D1a of the hologram A comes out simultaneously when the hologram B is recorded, the reproduced beam D1a is detected and reproduced on the CCD 10a. The lens 11a is used to form the image of the reproduced beam D1a on the CCD 10a. In this instance, the light receiving surface of the CCD 10a is disposed at the position α' within the back focal point plane of the lens 11a, which is the reproduction optical system, as with the arrangement of the spatial light modulator 5a with respect to the lens 6a used as the signal light beam irradiation optical system. Accordingly, the reproduced beam D1a is invariably converted to a parallel beam by the lens 11a and detected by going incident on the light receiving surface of the CCD 10a. Likewise, the reproduced beam D1a and the reproduced beam D1b of the hologram A and the hologram B, respectively, come out simultaneously when the hologram C is recorded. It is thus possible to reproduce a desired hologram reproduced beam by disposing the CCD 10a at either the position α' or β'.

In a case where the shifting (linear parallel movement) of the CCD 10a is adopted, the movement directions of the spatial light modulator 5a and the CCDs 10a are within the planes parallel to each other. Hence, there is an advantage that the positions of the spatial light modulator 5a and the CCDs 10a can be readily controlled.

Even after all the operations involved in the recording end, reproduced beams of a plurality of holograms come out by irradiating the reproducing reference beam having the same incident conditions and characteristics (the wavelength and the phase distribution) as the recording reference beam. Hence, by disposing the three CCDs 10a at the positions α', β', and γ', it is possible to obtain the reproduced beams D1a, D1b, and D1c simultaneously, which makes it possible to achieve reproduction at a high transfer rate. As has been described, the number of the two-dimensional image capturing portions can be fewer than the number of the reproduction optical systems. In addition, it is possible to configure in such a manner that the signal light beam irradiation optical systems and the reproduction optical systems are fixed for the signal light irradiation optical systems and the reproduction optical systems to have a one-to-one correspondence as is shown in FIG. 11.

The example above described the method by which the two-dimensional image capturing portion is disposed in a plural form or moved to a plurality of positions so as to carry out reproduction or verification by obtaining a plurality of hologram reproduced beams. The invention, however, is not particularly limited to this example. It may be configured in such a manner that the light receiving surface of the single two-dimensional image capturing portion is divided to more than one region, so that the single two-dimensional image capturing portion is formed substantially as a plurality of two-dimensional image capturing portions.

For example, as is shown at the bottom of FIG. 11, it may be configured in such a manner that a single CCD 10b having a light receiving surface LA large enough to receive a plurality of reproduced beams D1a, D1b, and D1b simultaneously is used instead of the three CCDs 10a. The light receiving surface is divided to: a region L1 as a first region on which the image of the reproduced beam D1a is formed, a region L2 as a second region on which the image of the reproduced beam D1b is formed, and a region L3 as a third region on which the image of the reproduced beam D1c is formed, so that the respective reproduced beams D1a, D1b, and D1c are detected and obtained using the regions L1 through L3, respectively. The similar effect can be achieved in this case, too.

The concrete configuration of the optical axis changing portion formed of the movable mirror 7 shown in FIG. 1 will now be described more in detail. FIG. 12 through FIG. 15 show an example of the optical changing portion that changes the irradiation angle of the signal light beam with respect to the recording medium in the recording/reproducing method and the recording/reproducing device of this embodiment described above.

Figure 12:
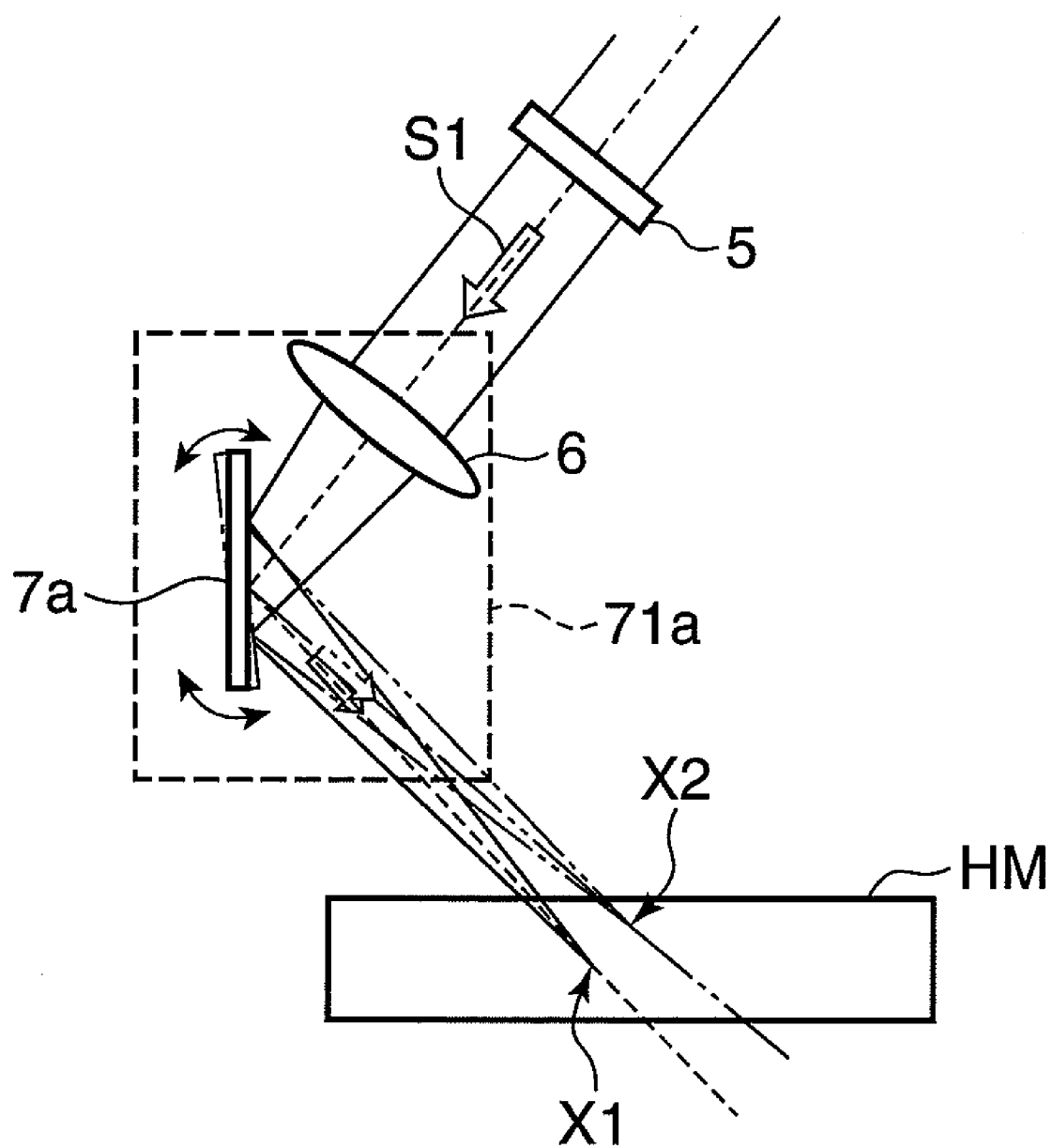
FIG. 12 is a schematic view showing an example of an optical axis changing portion adoptable to the first embodiment.

Referring to FIG. 12, a signal light beam irradiation optical system 71a is formed of a Fourier transform lens 6 and a mirror 7a. After the signal light beam S1 containing the two-dimensional information is formed by the spatial light modulator 5, the signal light beam is irradiated to the recording medium HM by the Fourier transform lens 6. In this instance, by disposing the mirror 7a at a desired position between the Fourier transform lens 6 and the recording medium HM as the optical axis changing portion and rotating the mirror 7a, it becomes possible to change the optical axis angle of the signal light beam, that is, the irradiation angle of the signal light beam with respect to the recording medium HM.

In a case where the rotation mechanism alone is provided to the mirror 7a as is shown in FIG. 12, the irradiation position in the recording medium HM changes with a change of the optical axis angle. For example, points denoted by X1 and X2 in FIG. 12 are the focal positions of the signal light beam at different mirror angles and these positions are different in the recording medium HM. Accordingly, it is necessary, for example, to move the recording medium HM for enabling the hologram multiplexing recording in the same recording region, which raises a need to additionally provide a movement mechanism (not shown) of the recording medium HM.

Figure 13:
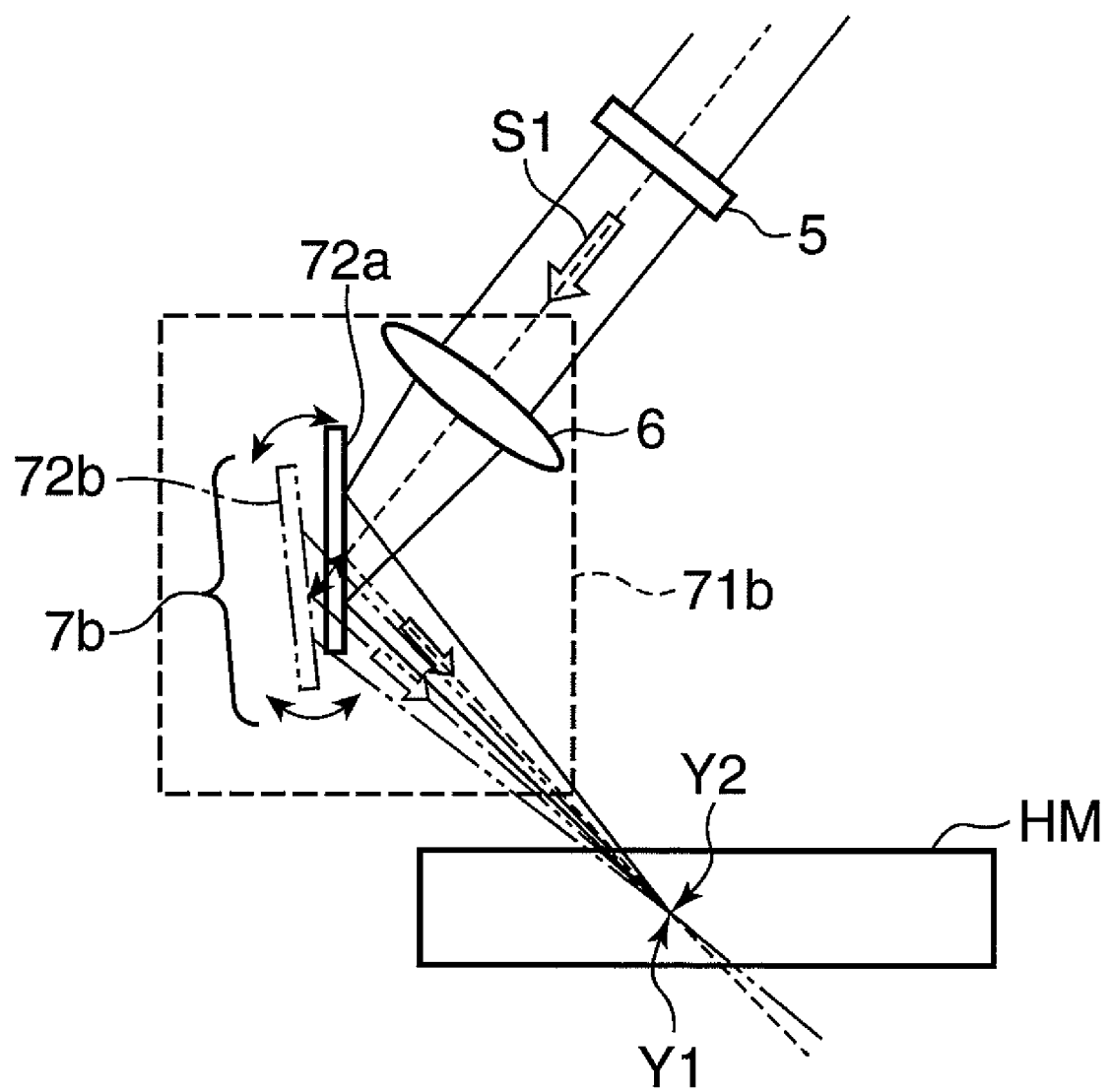
FIG. 13 is a schematic view showing another example of the optical axis changing portion adoptable to the first embodiment.

As means for improving this drawback, as is shown in FIG. 13, it is effective to form a signal light irradiation optical system 71b from a Fourier transform lens 6 and a mirror 7b and to provide the mirror 7b with a mechanism that rotates and shifts the mirror 7b as the optical axis changing portion. By providing the shifting mechanism, it becomes possible to correct displacement of the irradiation position resulting from rotations of the mirror 7b and to irradiate signal light beams to the same recording region with ease. For example, points denoted by Y1 and Y2 in FIG. 13 are the focal positions of the signal light beam when the mirror 7b is at different angles: the mirror angles 72a and 72b, respectively. By rotating and shifting the mirror 7b, it is possible to bring the both positions into coincidence with each other in the recording medium HM.

It should be appreciated that the configuration of the optical axis changing portion is not particularly limited to the example above. The spatial light modulator and the signal light beam irradiation optical system may be formed into one unit (the mirror is allowed to rotate). Hence, it is possible to provide an optical axis interval changing portion that changes the interval between the optical axis of the reference beam (not shown) and the optical axis of the signal light beam by shifting the spatial light modulator and the signal light irradiation optical system as one unit to bring the focal positions of the signal light beams into coincidence with each other as the optical axis changing portion. In this case, because it is possible to control the irradiation position of the signal light beam on the recording medium HM using the optical axis interval changing portion, the shifting mechanism, such as the mirror as is shown in FIG. 13, can be omitted.

Figure 14:
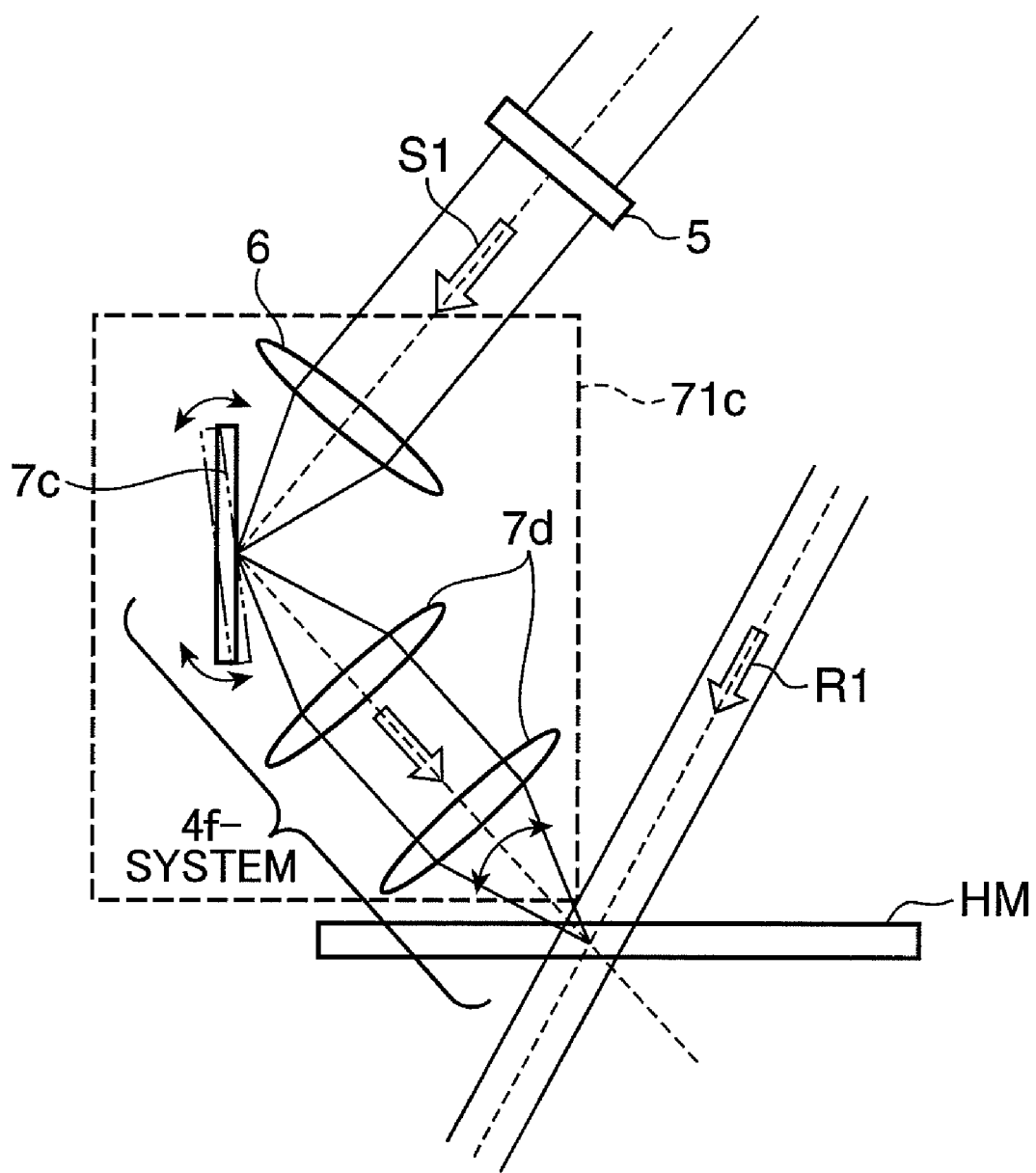
FIG. 14 is a schematic view showing still another example of the optical axis changing portion adoptable to the first embodiment.

As another example of the optical axis changing portion, a signal light beam irradiation optical system 71c in FIG. 14 is formed of a Fourier transform lens 6, a mirror 7c, and an optical system 7d generally called a 4f-system lens group. After a signal light beam S1 containing the two-dimensional image is formed by the spatial light modulator 5, a Fourier transformed image of the signal light beam is irradiated on the mirror 7c by the Fourier transform lens 6. An irradiation point of the signal light beam on the mirror 7c and a desired point in the recording medium HM have an image forming relation in a one-to-one correspondence owing to the 4f-system lens group 7d, and the optical axis changing portion is formed of the mirror 7c and the 4f-system lens group 7d.

In this case, it is possible to change the irradiation angle of the signal light beam with respect to the mirror 7c and the irradiation angle of the signal light beam with respect to the recording medium HM, that is, the optical axis of the signal light beam, by the rotations of the mirror 7c. In this instance, using the 4f-system lens group 7d can provide an effect that the irradiation angle of the signal light beam with respect to the recording medium HM can be changed without changing the irradiation position in the recording medium HM.

Second Embodiment

Figure 15:
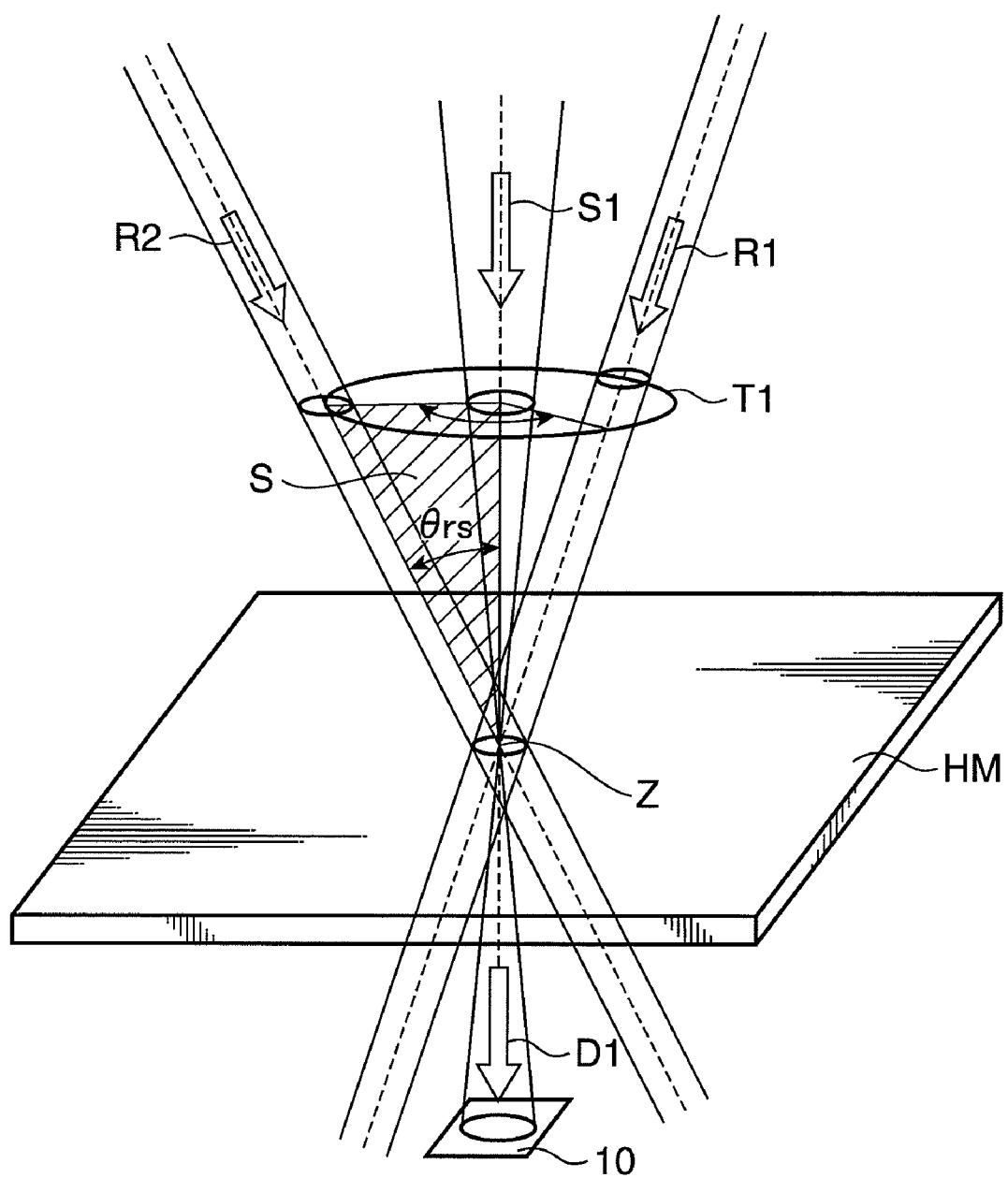
FIG. 15 is a view schematically showing the optical arrangement and the configuration in typical peristrophic multiplexing.

The first embodiment above described the hologram multiplexing recording and reproduction by angle multiplexing in order to describe the method and the device configuration to reproduce another hologram recorded in the same region using a reference beam to record an arbitrary hologram simultaneously with the hologram recording or within a light irradiation time for the hologram recording. This embodiment will describe a point that another hologram can be reproduced while an arbitrary hologram is recorded by peristrophic multiplexing on the basis of the same idea. FIG. 15 schematically shows the configuration to carry out peristrophic multiplexing as conventionally proposed.

Initially, when a first hologram is to be recorded, a reference beam R1 and a signal light beam S1 in FIG. 15 are irradiated to a recording medium HM. It is configured in such a manner that the irradiation region of the signal light beam S1 and the irradiation region of the reference beam R1 overlap in this instance on the surface of the recording medium HM or on a given plane inside the recording medium HM. Further, in order to multiplex-record holograms in the same region, for example, the signal light beam S1 and a reference beam R2 in FIG. 15 are irradiated after the reference beam is rotated about an arbitrary axis (for example, the optical axis of the signal light beam S1 in FIG. 15) while maintaining the angle yielded between the optical axis of the reference beam and the optical axis of the signal light beam. In this manner, the incident directions of the signal light beams (for example, the reference beams R1 and R2 in FIG. 15) are disposed in a circular shape (positions on a circle T1 indicated by a solid line in FIG. 15) about the optical axis of the signal light beam S1 (irradiation angle is almost perpendicular to the recording medium HM).

As has been described, the incident angle of the reference beam with respect to the recording medium HM is changed by rotating the plane defined by the optical axis of the signal light beam and the optical axis of the reference beam (for example, a region cut out from this plane and indicated by a capital S in FIG. 15 for ease of understanding) about the axis (the optical axis of the signal light beam S1 in FIG. 15) passing through the intersection Z of the optical axis of the signal light beam and the optical axis of the reference beam. It thus becomes possible to obtain the reference beam from a different incident direction with respect to the recording medium HM, which enables the hologram multiplexing recording in the same region.

When the hologram is reproduced, it is possible to select the hologram to be reproduced by selecting the reference beam at the desired irradiation angle (that is, the irradiation angle with respect to the recording medium HM) among the reference beams used at time of the recording. The resulting reproduced beam is detected and can be reproduced by the two-dimensional image capturing portion (for example, a CCD). In addition to this, the multiplicity can be increased by combining angle multiplexing and peristrophic multiplexing by further changing the angle ($\theta_{rs}$ in FIG. 15) yielded between the optical axis of the signal light and the optical axis of the reference beam. The irradiation angle of the reference beam during the recording can be changed as desired. It should be noted, however, that a cross talk to the reproduced beam becomes larger when reference beams at the irradiation angles close to each other are used, which raises a problem that an SNR of the reproduced signal becomes larger.

Figure 16:
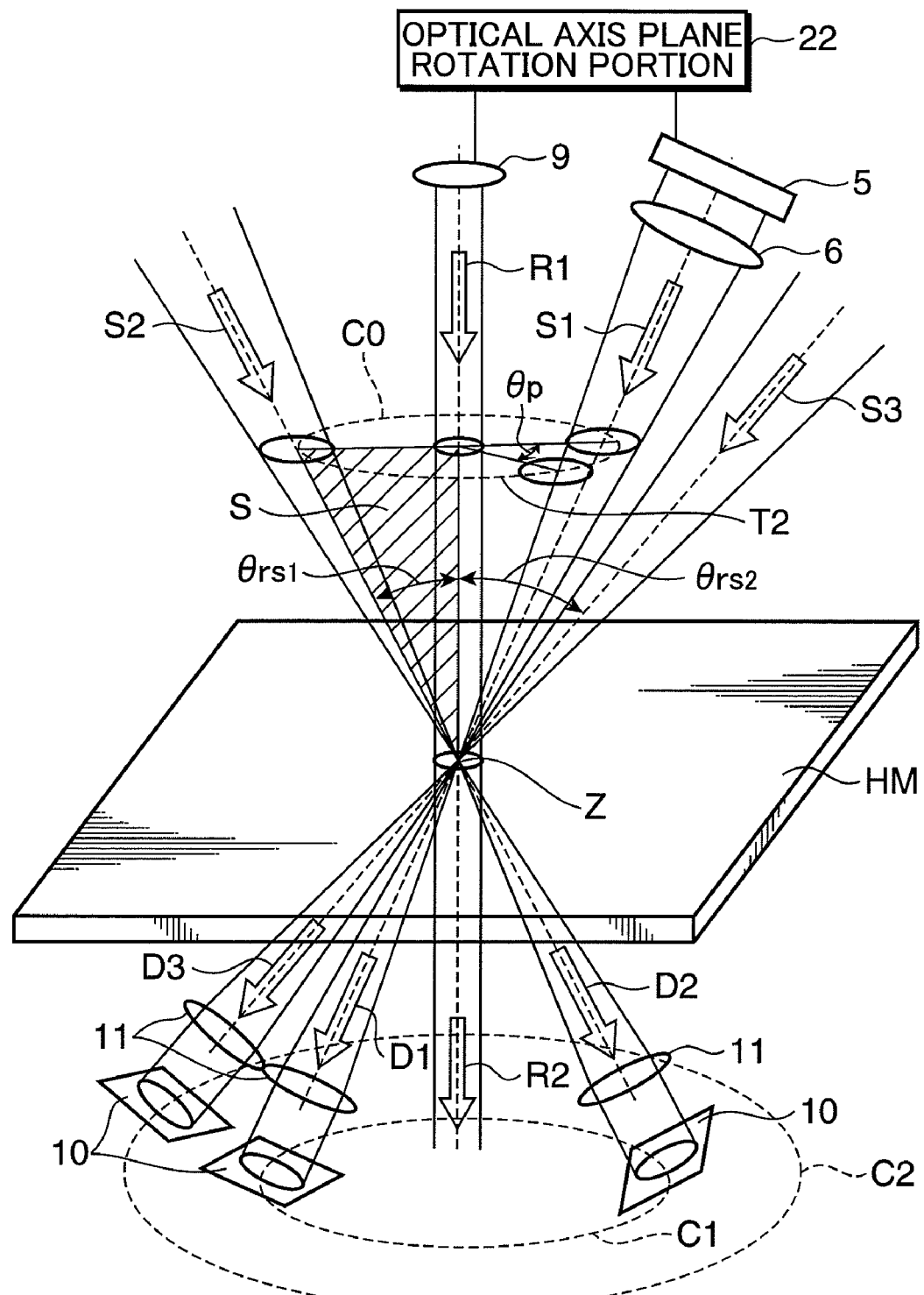
FIG. 16 is a schematic view showing an example of the configuration to reproduce a hologram recorded in an arbitrary region of a hologram recording medium simultaneously when a different hologram is recorded in the same region according to a second embodiment of the invention.

In peristrophic multiplexing described above, too, it is possible to reproduce another hologram simultaneously with the hologram recording by using the method and the device of the invention. FIG. 16 schematically shows the major configuration of an information recording/reproducing device of this embodiment. Only the characteristic configurations of this embodiment are shown in FIG. 16 and the configurations similar to those of the information recording/reproducing device shown in FIG. 1 are omitted herein.

Initially, when a first hologram is to be recorded, a reference beam R1 and a signal light beam S1 in FIG. 16 are irradiated to a recording medium HM. It is configured in such a manner that the irradiation region of the signal light beam S1 and the irradiation region of the reference beam R1 overlap in this instance on the surface of the recording medium HM or on a given surface inside the recording medium HM. Further, in order to multiplex-record holograms in the same region, for example, a signal light beam S2 and the reference beam R1 in FIG. 16 are irradiated after the reference beam and the signal light beam are rotated about an arbitrary axis (for example, the optical axis of the reference beam R1 in FIG. 16) while maintaining the angle yielded between the optical axis of the reference beam and the optical axis of the signal light beam.

To be more concrete, an optical axis plane rotation portion 22 is formed of a rotation mechanism, such as a stepping motor, and rotates the spatial light modulator 5 and the signal light irradiation optical system 6 integrally about the optical axis of the reference beam R1 as the rotation center, while maintaining the positional relation among the spatial light modulator 5, the signal light beam irradiation optical system 6, and the reference beam irradiation optical system 9. In this manner, the incident directions of the signal light beams (for example, the signal light beams S1 and S2 in FIG. 16) are disposed in a circular shape (for example, positions on a circle T2 indicated by a broken line in FIG. 16) about the optical axis of the reference beam R1 (irradiation angle with respect to the recording medium HM is almost perpendicular).

As has been described, the plane defined by the optical axis of the signal light beam and the optical axis of the reference beam (for example, a region cut out from this plane and indicated by a capital S in FIG. 16 for ease of understanding) is rotated about the axis (the optical axis of the reference beam R1 in FIG. 16) passing through the intersection Z of the optical axis of the signal light beam and the optical axis of the reference beam, and a plurality of holograms are recorded by changing the incident angle of the signal light beam with respect to the recording medium HM while the incident angle of the reference beam with respect to the recording medium HM is fixed. It thus becomes possible to obtain signal light beams having different irradiation angles, which enables the hologram multiplexing recording in the same region.

As has been described, a reproduced beam of another hologram is generated actively in the process of recording an arbitrary hologram by maintaining the irradiation angle of the reference beam used at the time of recording with respect to the recording medium HM invariable. In this instance, the two-dimensional information is reproduced by forming the image of the reproduced beam on the two-dimensional image capturing portion 10 (for example, a CCD) using the reproduction optical system 11 for the reproduced beam to be detected by the two-dimensional image capturing portion 10. In addition to this, it is possible to increase the multiplicity by combining angle multiplexing and peristrophic multiplexing by further changing the angle yielded between the optical axis of the signal light beam and the optical axis of the reference beam (for example, $\theta_{rs1} \rightarrow \theta_{rs2}$ in FIG. 16).

Regarding the reproduction of the holograms multiplex-recorded by this method, there is an advantage that a plurality of holograms can be reproduced simultaneously. This is because the holograms recorded by peristrophic multiplexing are recorded by substantially changing the polarization directions of the signal light beam and the reference beam with respect to the recording medium HM while maintaining the angle (for example, $\theta_{rs1}$ in FIG. 16) yielded between the reference beam and the signal light beam, a plurality of reproduced beams are generated simultaneously for the holograms recorded at the same $\theta_{rs1}$ by the polarization component of the reference beam at the time of reproduction.

The hologram recording/reproducing method of this embodiment is not the conventionally proposed peristrophic multiplexing as is shown in FIG. 15 (a method of changing the irradiation angle of the reference beam by rotating the reference beam with respect to the optical axis of the signal light beam S1 while fixing the irradiation angle of the signal light beam S1 with respect to the recording medium HM), but it is a method of carrying out the recording and the reproduction simultaneously by rotating the signal light beam with respect to the optical axis of the reference beam R1 while fixing the irradiation angle of the reference beam R1. In short, as with what is described in the first embodiment above, it is the point that the reference beam to record a given hologram is used as the reproducing reference beam for another hologram that is already recorded.

The exiting direction of the reproduced beam (for example, the reproduced signal D1, D2, or D3 in FIG. 16) obtained by being diffracted by the recorded hologram is disposed in a circular shape (the positions on a circles C1 and C2 indicated by a broken line in FIG. 16) about the optical axis of the reference beam (the irradiation angle is almost perpendicular to the recording medium HM). Accordingly, for the reproduction at a high transfer rate, it is preferable to prepare a plurality of reproduction optical systems 11 and two-dimensional image capturing portions 10 to dispose the incident directions in a concentric circular shape about the rotation axis. Also, in a case where fewer reproduction optical systems and two-dimensional image capturing portions are used, as with the first embodiment above, it is preferable to make it possible to select a reproduced beam to be obtained by moving the reproduction optical systems and the two-dimensional image capturing portions.

Also, by controlling the interval between the adjacent signal light beams in such a manner that when the angle yielded between the reference beam and the signal light beam is small (for example, in the case of $\theta_{rs1}$ in FIG. 16), a movement angular amount in peristrophic multiplexing (the angle yielded between a plane defined by the rotation axis (the optical axis of the reference beam) and the optical axis of the first signal light beam and a plane defined by the rotation axis (the optical axis of the reference beam) and the optical axis of the second signal light beam adjacent to the first signal light beam (for example, $\theta_p$ in FIG. 16), which is referred to as a peristrophic angle) is made larger, and the peristrophic angle is made smaller when the angle yielded between the reference beam and the signal light beam is large (for example, in the case $\theta_{rs2}$ of in FIG. 16), it is possible to achieve an effect that effective multiplicity and a high SNR can be achieved by selecting the arrangement in which the reproduced beams do not overlap (that is, eliminates a cross talk).

The recording/reproducing method and the device configuration of the invention by angle multiplexing described in the first embodiment can be also applied to the method adopting peristrophic multiplexing described in this embodiment, and the similar effect can be obtained.

Third Embodiment

The first embodiment above described the multiplexing recording and reproduction of holograms by angle multiplexing by way of example in a case where the incident angle of a signal light beam with respect to the recording medium is changed by mechanically moving a single signal light irradiation optical system as a concrete arrangement of the signal light beam irradiation optical system. In this embodiment, as the configuration and the arrangement of the signal light optical system that brings the similar effect, the configuration and an advantage in a case where there are a plurality of signal light beam optical systems will be described using the drawings.

Figure 17:
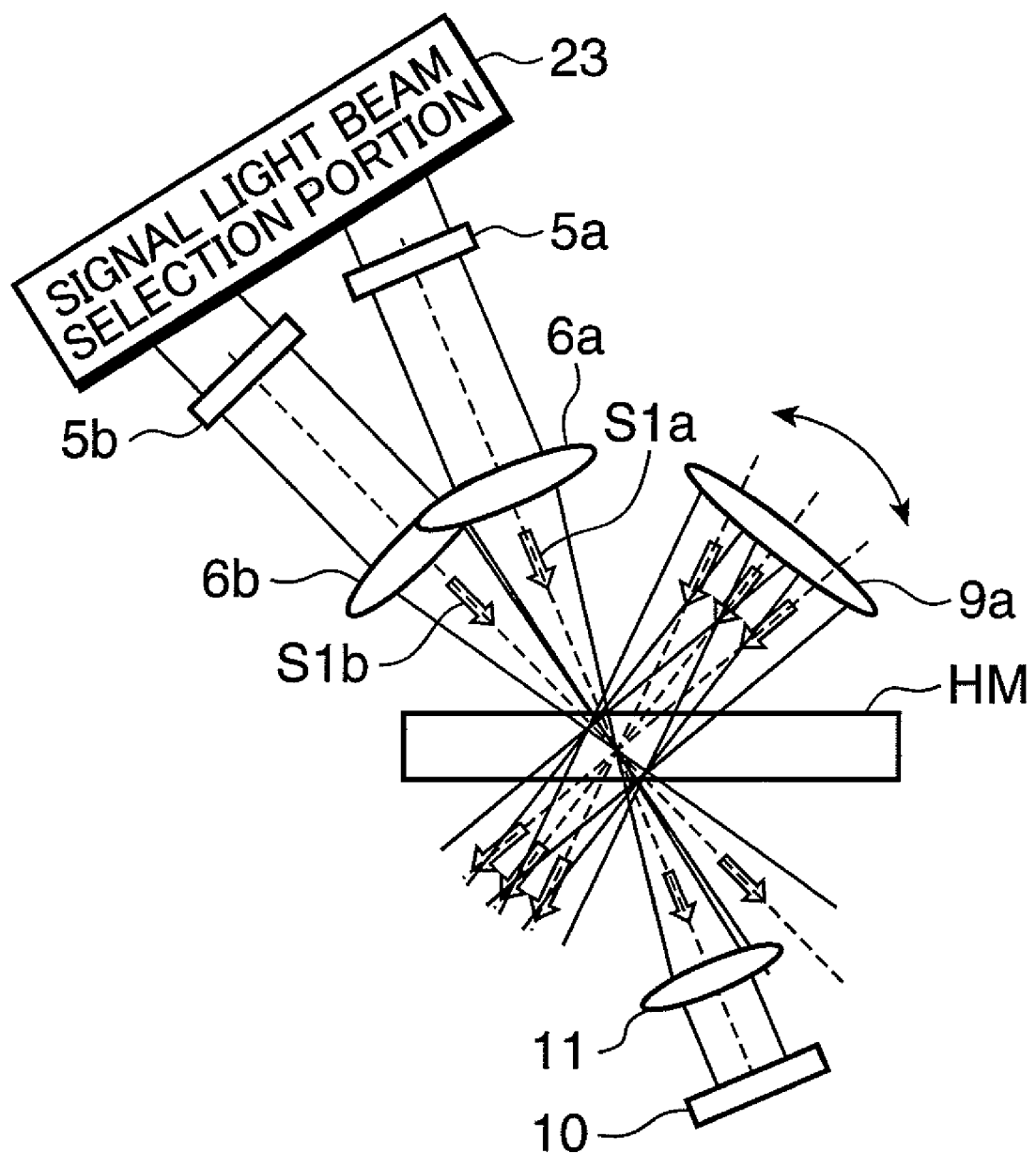
FIG. 17 is a schematic view showing an example of the configuration and the arrangement of an optical system having a plurality of signal light beam irradiation optical systems according to a third embodiment of the invention.

FIG. 17 is a view schematically showing the optical system arrangement in an information recording/reproducing device having two signal light beam irradiation optical systems. Only the characteristic configurations of this embodiment are shown in FIG. 17 and the configurations similar to those of the information recording/reproducing device shown in FIG. 1 are omitted in the drawing. It should be appreciated that, as with the first embodiment above, the laser light source 1, the laser drive circuit 17, the light amount detection portion 18, the recording sensitivity calculation portion 19, and so forth are included.

Referring to FIG. 17, 5a and 5b denote two spatial light modulators, 6a and 6b denote two signal light irradiation optical systems, HM denotes a recording medium, 9a denotes a reference beam irradiation optical system, numeral 10 denotes a CCD serving as a two-dimensional image capturing portion that detects and obtains a reproduced beam, numeral 11 denotes a reproduction optical system that forms the image of a reproduced beam on the light receiving surface of the CCD 10, and numeral 23 denotes a signal light beam selection portion that selects either a set of the spatial light modulator 5a and the signal light beam irradiation optical system 6a or a set of the spatial light modulator 5b and the signal light beam irradiation optical system 6b.

Hereinafter, the function of the information recording/reproducing device configured as above will be described. Referring to FIG. 17, light emitted from the light source is split easily to two beams (not shown) by an optical component, such as a beam splitter and a half mirror. One of the split beams is guided to one of the spatial light modulator 5a and the spatial light modulator 5b by the signal light beam selection portion 23. A signal light beam S1a or a signal light beam S1b containing desired two-dimensional information is generated by modulating this beam by the spatial light modulator 5a or 5b. Herein, the signal light beam selection portion 23 is formed, for example, of a mirror device (not shown), and which of the signal light beam S1a and the signal light beam S1b is used as the signal light beam is determined by selecting an optical path using the mirror device or the like. In addition, the other split beam is guided to the reference beam irradiation optical system 9a and used as the reference beam for the hologram recording.

The hologram recording is carried out by irradiating the signal light beam S1a or the signal light beam S1b to an arbitrary region on the recording medium HM by the signal light beam irradiation optical system 6a or 6b and by irradiating the reference beam to the recording medium HM so as to overlap the irradiation region of the signal light beam S1a or the signal light beam S1b (preferably, to cover the entire irradiation region of the signal light beam in order to prevent a loss of the two-dimensional information to be recorded) by the reference beam irradiation optical system 9a.

As is shown in FIG. 17, the irradiation angle of the reference beam can be readily changed by an irradiation angle changing portion (not shown). For example, by realizing the incident angles of a plurality of the reference beams with respect to the signal light beam S1a, the hologram multiplexing recording in the same recording region is enabled.

Also, by setting the incident angle of the reference beam, for example, to a plurality of pre-determined values $\theta_1$, $\theta_2, \ldots, \theta_N$ (the reference beams at these angles are referred to as the reference beam R1, the reference beam R2, ..., and the reference beam RN) and then multiplex-recording N holograms (a group of holograms A) by the signal light beam S1a and the reference beams R1 through RN, it is possible to multiplex-record N holograms (a group of holograms B) in the same region by the signal light beam S1b and the reference beam R1 through the reference beam RN by switching the path of the signal light beam. By using the reference beam at the incident angle same as the incident angle of the reference beam used when recording the group of holograms A when the group of the holograms B are recorded, it is possible to obtain diffracted beams (reproduced beams) from the group of the holograms A.

In this manner, for example, by disposing the reproduction optical system 11 and the CCD 10 at positions for the signal light beam S1a used when recording the group of holograms A to propagate by passing through the recording medium HM, it is possible to reproduce the two-dimensional image information by forming the image of the reproduced beam appropriately on the light receiving surface of the CCD 10. Also, for example, by obtaining the diffracted beams obtained from the group of holograms A as the light intensity, it becomes possible to monitor the recording sensitivity when the group of holograms A were recorded in the middle of the multiplexing recording.

Further, other effects are provided by adopting the configuration described in this embodiment. One of such effects is that the hologram recording at a high transfer rate can be achieved by having irradiation paths of a plurality of signal light beams. By using a plurality of spatial light modulators and a plurality of signal light beam irradiation optical systems simultaneously, and for example, by irradiating a plurality of signal light beams simultaneously for one reference beam, it becomes possible to record a plurality of holograms. For example, the signal light beam selection portion 23 guides the signal light beams to both a set of the spatial light modulator 5a and the signal light beam irradiation optical system 6a and a set of the spatial light modulator 5b and the signal light beam irradiation optical system 6b, so that a plurality of holograms are recorded simultaneously using the signal light beam S1a and the signal light beam S1b. In this case, because a plurality of holograms are recorded simultaneously, the hologram recording is enabled at a high transfer rate. In addition, in a case where a plurality of holograms are recorded simultaneously, the M/# is consumed less than in a case where a plurality of holograms are recoded separately, which can provide an effect that a larger capacity can be realized.

In a case where a plurality of holograms are multiplex-recorded simultaneously, in order to monitor the recording sensitivity as described above and to reproduce a signal in the middle of the recording, for example, non-simultaneous multiplexing recording is carried out about once in every certain number of times. To be more concrete, when a plurality of holograms are multiplex-recorded simultaneously, the signal light beam selection portion 23 guides signal light beams to the spatial light modulator 5a and the spatial light modulator 5b, so that different pieces of two-dimensional information are recorded as different holograms simultaneously in the same region of the recording medium HM by a set of the spatial light modulator 5a and the signal light beam irradiation optical system 6a and a set of the spatial light modulator 5b and the signal light beam irradiation optical system 6b. After the simultaneous multiplexing recording is repeated continuously several tens of times, as the non-simultaneous multiplexing recording, the signal light beam selection portion 23 guides the signal light beam S1a alone to the spatial light modulator 5a to record the hologram A, after which the signal light beam S1b alone is guided to the spatial light modulator 5b to reproduce the hologram A simultaneously when the hologram B is recorded. In this instance, as with the first embodiment above, the light amount detection portion 18 detects a light amount of the diffracted beam from the hologram A. The recording sensitivity calculation portion 19 calculates the recording sensitivity during the simultaneous multiplexing recoding on the basis of the light amount of the diffracted beam thus detected. The laser drive circuit 17 controls an output of the laser light source 1 according to the recording sensitivity.

By carrying out non-simultaneous multiplexing recording as described above, it is possible to obtain the diffracted beam from the hologram A recorded by the signal light beam S1$a$ while the recording using the signal light beam S1$b$ is taking place. It is possible to know a change of the recording sensitivity as quasi-real time information in the middle of the multiplexing recording by calculating the recording sensitivity during the simultaneous multiplexing recording from the diffracted beam, which facilitates a correction of the recording scheduling. Hence, not only is it possible to achieve the hologram recording of a large capacity at a high transfer rate, but it is also possible to enhance the stability and the reliability of the information recording markedly for the recording and the reproduction of holograms by multiplexing recording by eliminating a variance of the diffraction efficiency of the multiplexed holograms. A change of the recording sensitivity is relatively mild while holograms having small diffraction efficiency (so-called weak holograms) are multiplex-recorded. Hence, it is not necessary to understand the recording sensitivity when all the holograms were recorded.

The invention can be summarized as follows from the respective embodiments described above. That is to say, an information recording/reproducing device of the invention includes: a spatial light modulator configured to form a signal light beam containing arbitrary two-dimensional information; a signal light beam irradiation optical system configured to irradiate the signal light beam to an arbitrary region of a hologram recording medium; a reference beam irradiation optical system configured to irradiate a reference beam emitted from a same light source as the signal light beam to the region of the hologram recording medium to which the signal light beam is irradiated; a diffracted beam obtaining portion configured to obtain a diffracted beam from the hologram recording medium; and an optical axis changing portion configured to change an incident angle of the signal light beam with respect to the hologram recording medium. The signal light beam irradiation optical system and the reference beam irradiation optical system irradiate the signal light beam and the reference beam, respectively, to the arbitrary region of the hologram recording medium to record a first hologram. The optical axis changing portion changes the incident angle of the signal light beam with respect to the hologram recording medium after the first hologram is recorded, and the signal light beam irradiation optical system and the reference beam irradiation optical system irradiate, respectively, a signal light beam whose incident angle has been changed and a reference beam substantially same as the reference beam used when recording the first hologram to multiplex-record a second hologram, which is different from the first hologram, in a region same as the region in which the first hologram is recorded while the diffracted beam obtaining portion obtains at least a part of a diffracted beam from the first hologram simultaneously.

In the information recording/reproducing device, when a plurality of holograms are multiplex-recorded in an arbitrary region of the hologram recording medium and reproduced, already recorded another first hologram is reproduced simultaneously when an arbitrary second hologram is recorded. It thus becomes possible to use a reference beam used to record the second hologram for reproducing the first hologram. Accordingly, it is not necessary to irradiate a reproducing reference beam. Hence, it is possible to reproduce information recorded in the hologram recording medium while preventing deterioration of a recordable capacity of the hologram recording medium, which makes it possible to check the reproduced information.

It is preferable that the diffracted beam obtaining portion includes a reproduction optical system and a two-dimensional image capturing portion, and that the reproduction optical system forms an image of the diffracted beam from the first hologram on the two-dimensional image capturing portion and the two-dimensional image capturing portion obtains two-dimensional information from the diffracted beam that is imaged.

In this case, the two-dimensional information can be obtained from the diffracted beam, which makes it possible to read out a large volume of data in a short time.

It is preferable that the number of the reproduction optical system is smaller than the number of the two-dimensional image capturing portion.

In this case, the cost of the device can be saved by reducing the number of the reproduction optical system.

It is preferable that a light receiving surface of the two-dimensional image capturing portion is divided to a plurality of regions on each of which an image of a diffracted beam from one hologram is formed.

In this case, a plurality of holograms can be reproduced simultaneously using a single two-dimensional image capturing portion. Hence, not only is it possible to reproduce a large volume of data at a high transfer rate, but it is also possible to save the cost of the device.

It is preferable that the reproduction optical system is formed of a set of image-forming optical systems and the two-dimensional image capturing portion includes a plurality of two-dimensional image capturing portions, and that the reproduction optical system forms images of a plurality of diffracted beams from a plurality of holograms already recorded as the first hologram on the light receiving surfaces of the plurality of two-dimensional image capturing portions simultaneously with recording of the second hologram and the plurality of two-dimensional image capturing portions obtain a plurality of pieces of two-dimensional information from the plurality of diffracted beams that are imaged.

In this case, a plurality of holograms can be reproduced simultaneously using a set of image-forming optical systems. Hence, not only is it possible to reproduce a large volume of data at a high transfer rate, but it is also possible to save the cost of the device.

It is preferable that each of the light receiving surfaces of the plurality of two-dimensional image capturing portions is disposed within a back focal point plane of the image-forming optical system.

In this case, deformation and distortion of images formed on the respective light receiving surfaces of the plurality of two-dimensional image capturing portions can be eliminated almost completely. It is thus possible to obtain a plurality of satisfactory reproduced images simultaneously.

It is preferable that the reproduction optical system includes a plurality of reproduction optical systems and the two-dimensional image capturing portion includes a plurality of two-dimensional image capturing portions, and that the plurality of reproduction optical systems form images of a plurality of diffracted beams from a plurality of holograms already recorded as the first hologram on light receiving surfaces of the plurality of two-dimensional image capturing portions simultaneously with recording of the second hologram and the plurality of two-dimensional image capturing portions obtain a plurality of pieces of two-dimensional information from the plurality of diffracted beams that are imaged.

In this case, because a plurality of holograms can be reproduced simultaneously, it is possible to reproduce a large volume of data at a high transfer rate.

It is preferable that the respective light receiving surfaces of the plurality of two-dimensional image capturing portions are at almost equal distances from an intersection of an optical axis of the signal light beam and an optical axis of the reference beam and disposed almost perpendicularly to an optical axis of each of the diffracted beams from the plurality of holograms.

In this case, because the optical positional relation from each hologram to the corresponding two-dimensional image capturing portion can be maintained, deformation and distortion of images formed on the respective light receiving surfaces of the two-dimensional image capturing portions can be eliminated almost completely. It is thus possible to obtain a plurality of satisfactory reproduced images simultaneously.

It is preferable that respective reproduced images of the diffracted beams do not overlap one another on the light receiving surface of the two-dimensional image capturing portion.

In this case, the respective reproduced images do not overlap one another on the light receiving surface of the two-dimensional image capturing portion. It is thus possible to enhance a signal-to-noise ratio by reducing cross talks from an adjacent reproduced image.

It is preferable that the signal light beam irradiation optical system includes a plurality of signal light beam irradiation optical systems, and that the optical axis changing portion includes a signal light beam selection portion that changes the incident angle of the signal light beam with respect to the hologram recording medium by selecting at least one signal light beam irradiation optical system from the plurality of signal light beam irradiation optical systems.

In this case, it is possible to multiplex-record holograms by selecting at least one signal light beam irradiation optical system from a plurality of signal light beam irradiation optical systems and by changing the incident angle of the signal light beam with respect to the hologram recording medium.

It is preferable that the optical axis changing portion includes an optical axis plane rotation portion that rotates at least the signal light beam in such a manner that a plane defined by an optical axis of the signal light beam and an optical axis of the reference beam rotates about, as a rotation axis, an arbitrary axis passing through an intersection of the optical axis of the signal light beam and the optical axis of the reference beam, and that a plurality of holograms are multiplex-recorded in an arbitrary same region of the hologram recording medium while at least the signal light beam is rotated by the optical axis plane rotation portion.

In this case, it is possible to obtain signal light beams having different irradiation angles. Hence, not only hologram multiplexing recording in the same region is enabled, but also the configuration of the optical axis plane rotation portion can be simpler owing to the use of the rotation mechanism.

It is preferable that the information recording/reproducing device further includes a recorded information accumulation portion configured to temporarily store recorded information that is recorded as the first hologram, and a checking portion configured to check the recorded information stored in the recorded information accumulation portion against reproduced information generated according to the diffracted beam from the first hologram obtained by the diffracted beam obtaining portion.

In this case, the recorded information can be checked without having to wait until the recording reaches the feasible maximum multiplicity in the arbitrary region. It thus becomes possible to check recorded information at a high speed while suppressing a capacity of the recorded information accumulation portion provided to the device. In addition, the step of reading out the recorded data again for the purpose of checking can be eliminated, which makes it possible to record two-dimensional information at a high transfer rate.

It is preferable that the diffracted beam obtaining portion includes a light amount detection portion that detects a light amount of the diffracted beam from the first hologram, and that the information recording/reproducing device further includes a recording sensitivity calculation portion configured to calculate recording sensitivity of the hologram recording medium according to the light amount of the diffracted beam detected by the light amount detection portion.

In this case, by obtaining a diffracted beam from the already recorded first hologram simultaneously with the multiplexing recording of the second hologram, it becomes possible to calculate the recording sensitivity of a hologram recording material when the first hologram was recorded. Accordingly, a change of the recording sensitivity in the arbitrary recording region can be known as quasi-real time information in the middle of the multiplexing recording, which facilitates a correction of the recording scheduling.

It is preferable that: the signal light beam irradiation optical system includes a plurality of signal light beam irradiation optical systems to multiplex-record a plurality of holograms simultaneously using a plurality of signal light beams; the information recording/reproducing device further includes a signal light beam selection portion configured to select one signal light beam irradiation optical system successively from the plurality of signal light beam irradiation optical systems to carry out non-simultaneous multiplexing recording to multiplex-record a plurality of holograms successively during simultaneous multiplexing recording; and the light amount detection portion detects a light amount of a diffracted beam from already recorded holograms using any signal light beam irradiation optical system that has not been selected by the signal light beam selection portion during the non-simultaneous multiplexing recording, and the recording sensitivity calculation portion calculates the recording sensitivity during the simultaneous multiplexing recording according to the light amount of the diffracted beam detected by the light amount detection portion.

In this case, it is possible to calculate the recording sensitivity during the simultaneous multiplexing recording by carrying out non-simultaneous multiplexing recording at a specific frequency while the simultaneous multiplexing recording is carried out multiple times. Accordingly, a change of the recording sensitivity can be known as quasi-real time information in the middle of the multiplexing recording, which facilitates a correction of the recording scheduling. Consequently, not only is it possible to record holograms in a large capacity at a high transfer rate, but it is also possible to markedly enhance the stability and the reliability of the information recording for recording and reproducing holograms by multiplexing recording by eliminating a variance of the diffraction efficiency among multiplexed holograms. In addition, because a plurality of holograms are recorded simultaneously except at the time of the non-simultaneous multiplexing recording, the M number is consumed less, which can in turn increase a capacity.

Also, a hologram recording/reproducing method of the invention is configured to record a first hologram by irradiating a signal light beam containing arbitrary two-dimensional information and a reference beam emitted from a same light source as the signal light beam to an arbitrary region of a hologram recording medium, and change an incident angle of the signal light beam with respect to the hologram recording medium after the first hologram is recorded and multiplex-record a second hologram, which is different from the first hologram, in a same region as the region in which the first hologram is recorded by irradiating a signal light beam whose incident angle has been changed and a substantially same reference beam as the reference beam used when recording the first hologram while at least a part of a diffracted beam from the first hologram is obtained simultaneously.

With the hologram recording/reproducing method, when a plurality of holograms are multiplex-recorded in an arbitrary region of the hologram recording medium and reproduced, already recorded another first hologram is reproduced simultaneously when an arbitrary second hologram is recorded. It thus becomes possible to use a reference beam used to record the second hologram for reproducing the first hologram. Accordingly, it is not necessary to irradiate a reproducing reference beam. Hence, it is possible to reproduce information recorded in the hologram recording medium while preventing deterioration of a recordable capacity of the hologram recording medium, which makes it possible to check the reproduced information.

It is preferable that a plurality of holograms are angle multiplex-recorded in an arbitrary recording region of the hologram recording medium by successively changing the incident angle of the signal light beam with respect to the hologram recording medium.

In this case, angle multiplexing recording is carried out by successively changing the incident angle of the signal light beam. Hence, it is possible to obtain a diffracted beam from a hologram that is just recorded when the reference beam is constant. It is thus possible to check reproduced information in quasi-real time in the middle of the multiplexing recording.

It is preferable that a plurality of holograms are multiplex-recorded in an arbitrary recording region of the hologram recording medium by rotating at least the signal light beam in such a manner that a plane defined by an optical axis of the signal light beam and an optical axis of the reference beam rotates about, as a rotation axis, an arbitrary axis passing through an intersection of the optical axis of the signal light beam and the optical axis of the reference beam.

In this case, signal light beams having different irradiation angles can be obtained. Hence, not only multiplexing recording of holograms in the same region is enabled, but also the configuration of the mechanism can be simpler owing to the use of the rotation mechanism for moving the signal light beam.

It is preferable that an image of the diffracted beam from the first hologram is formed and two-dimensional information is obtained from the diffracted beam that is imaged.

In this case, because two-dimensional information can be obtained from a diffracted beam, it is possible to read out a large volume of data in a short time.

It is preferable that the signal light beam is formed to be capable of irradiating the hologram recording medium via a plurality of signal light beam irradiation optical systems, and that at least one signal light beam irradiation optical system is selected from the plurality of signal light beam irradiation optical systems and a plurality of holograms are multiplex-recorded using a signal light beam from the signal light beam irradiation optical system that has been selected.

In this case, it is possible to multiplex-record holograms by selecting at least one signal light beam irradiation optical system from the plurality of signal light beam irradiation optical systems and by changing the incident angle of the signal light beam with respect to the hologram recording medium.

It is preferable that information recorded as the first hologram is stored temporarily and the recorded information that has been stored is checked against reproduced information generated according to the diffracted beam from the first hologram.

In this case, the recorded information can be checked without having to wait until the recording reaches the feasible maximum multiplicity in the arbitrary region. It thus becomes possible to check recorded information at a high speed while suppressing a capacity of a buffer memory. In addition, the step of reading out the recorded data again for the purpose of checking can be eliminated, which makes it possible to record two-dimensional information at a high transfer rate.

It is preferable that a reproducing reference beam is irradiated to a plurality of holograms already multiplex-recorded in a same region of the hologram recording medium so as to reproduce a plurality of diffracted beams from the plurality of holograms simultaneously.

In this case, because a plurality of holograms can be reproduced simultaneously, it is possible to reproduce a large volume of data at a high transfer rate.

INDUSTRIAL APPLICABILITY

The hologram recording/reproducing method of the invention has effects that the recorded data can be reproduced and checked while preventing deterioration of a recordable capacity of a recording medium, the recorded data can be checked at a high speed while suppressing a capacity of a buffer memory provided to the device, and two-dimensional information can be recorded at a high transfer rate. This hologram recording/reproducing method is therefore useful as a hologram recording/reproducing method at a high transfer rate.

The invention claimed is:

1. An information recording/reproducing device, comprising:
   a spatial light modulator configured to form a signal light beam containing arbitrary two-dimensional information;
   a signal light beam irradiation optical system including an optical axis changing portion that changes an incident angle of the signal light beam with respect to a hologram recording medium and configured to irradiate the signal light beam to an arbitrary region of the hologram recording medium;
   a reference beam irradiation optical system configured to irradiate a reference beam emitted from a same light source as the signal light beam to the region of the hologram recording medium to which the signal light beam is irradiated; and
   a diffracted beam obtaining portion configured to obtain a diffracted beam from the hologram recording medium, wherein:
   the signal light beam irradiation optical system and the reference beam irradiation optical system irradiate the signal light beam and the reference beam, respectively, to the arbitrary region of the hologram recording medium to record a first hologram; and
   the optical axis changing portion changes the incident angle of the signal light beam with respect to the hologram recording medium after the first hologram is recorded, and the signal light beam irradiation optical system and the reference beam irradiation optical system irradiate, respectively, a signal light beam whose incident angle has been changed and a reference beam substantially same as the reference beam used when recording the first hologram to multiplex-record a second hologram, which is different from the first hologram, in a region same as the region in which the first hologram is recorded while the diffracted beam obtaining portion obtains at least a part of a diffracted beam from the first hologram simultaneously.

2. The information recording/reproducing device according to claim 1, wherein:
the diffracted beam obtaining portion includes a reproduction optical system and a two-dimensional image capturing portion; and
the reproduction optical system forms an image of the diffracted beam from the first hologram on the two-dimensional image capturing portion and the two-dimensional image capturing portion obtains two-dimensional information from the diffracted beam that is imaged.

3. The information recording/reproducing device according to claim 2, wherein:
the number of the reproduction optical system is smaller than the number of the two-dimensional image capturing portion.

4. The information recording/reproducing device according to claim 2, wherein:
a light receiving surface of the two-dimensional image capturing portion is divided to a plurality of regions on each of which an image of a diffracted beam from one hologram is formed.

5. The information recording/reproducing device according to claim 2, wherein:
the reproduction optical system is formed of a set of image-forming optical systems and the two-dimensional image capturing portion includes a plurality of two-dimensional image capturing portions; and
the reproduction optical system forms images of a plurality of diffracted beams from a plurality of holograms already recorded as the first hologram on the light receiving surfaces of the plurality of two-dimensional image capturing portions simultaneously with recording of the second hologram and the plurality of two-dimensional image capturing portions obtain a plurality of pieces of two-dimensional information from the plurality of diffracted beams that are imaged.

6. The information recording/reproducing device according to claim 5, wherein:
each of the light receiving surfaces of the plurality of two-dimensional image capturing portions is disposed within a back focal point plane of the image-forming optical system.

7. The information recording/reproducing device according to claim 2, wherein:
the reproduction optical system includes a plurality of reproduction optical systems and the two-dimensional image capturing portion includes a plurality of two-dimensional image capturing portions; and
the plurality of reproduction optical systems form images of a plurality of diffracted beams from a plurality of holograms already recorded as the first hologram on light receiving surfaces of the plurality of two-dimensional image capturing portions simultaneously with recording of the second hologram and the plurality of two-dimensional image capturing portions obtain a plurality of pieces of two-dimensional information from the plurality of diffracted beams that are imaged.

8. The information recording/reproducing device according to claim 7, wherein:
the respective light receiving surfaces of the plurality of two-dimensional image capturing portions are at almost equal distances from an intersection of an optical axis of the signal light beam and an optical axis of the reference beam and disposed almost perpendicularly to an optical axis of each of the diffracted beams from the plurality of holograms.

9. The information recording/reproducing device according to claim 2, wherein:
respective reproduced images of the diffracted beams do not overlap one another on the light receiving surface of the two-dimensional image capturing portion.

10. The information recording/reproducing device according to claim 1, wherein:
the signal light beam irradiation optical system includes a plurality of signal light beam irradiation optical systems; and
the optical axis changing portion includes a signal light beam selection portion that changes the incident angle of the signal light beam with respect to the hologram recording medium by selecting at least one signal light beam irradiation optical system from the plurality of signal light beam irradiation optical systems.

11. The information recording/reproducing device according to claim 1, wherein:
the optical axis changing portion includes an optical axis plane rotation portion that rotates at least the signal light beam in such a manner that a plane defined by an optical axis of the signal light beam and an optical axis of the reference beam rotates about, as a rotation axis, an arbitrary axis passing through an intersection of the optical axis of the signal light beam and the optical axis of the reference beam; and
a plurality of holograms are multiplex-recorded in an arbitrary same region of the hologram recording medium while at least the signal light beam is rotated by the optical axis plane rotation portion.

12. The information recording/reproducing device according to claim 1, further comprising:
a recorded information accumulation portion configured to temporarily store recorded information that is recorded as the first hologram; and
a checking portion configured to check the recorded information stored in the recorded information accumulation portion against reproduced information generated according to the diffracted beam from the first hologram obtained by the diffracted beam obtaining portion.

13. The information recording/reproducing device according to claim 1, wherein:
the diffracted beam obtaining portion includes a light amount detection portion that detects a light amount of the diffracted beam from the first hologram; and
the information recording/reproducing device further comprises a recording sensitivity calculation portion configured to calculate recording sensitivity of the hologram recording medium according to the light amount of the diffracted beam detected by the light amount detection portion.

14. The information recording/reproducing device according to claim 13, wherein:
the signal light beam irradiation optical system includes a plurality of signal light beam irradiation optical systems to multiplex-record a plurality of holograms simultaneously using a plurality of signal light beams;

the optical axis changing portion includes a signal light beam selection portion configured to select one signal light beam irradiation optical system successively from the plurality of signal light beam irradiation optical systems to carry out non-simultaneous multiplexing recording to multiplex-record a plurality of holograms successively during simultaneous multiplexing recording; and the light amount detection portion detects a light amount of a diffracted beam from already recorded holograms using any signal light beam irradiation optical system that has not been selected by the signal light beam selection portion during the non-simultaneous multiplexing recording, and the recording sensitivity calculation portion calculates the recording sensitivity during the simultaneous multiplexing recording according to the light amount of the diffracted beam detected by the light amount detection portion.

15. A hologram recording/reproducing method, comprising the steps of:

recording a first hologram by irradiating a signal light beam containing arbitrary two-dimensional information and a reference beam emitted from a same light source as the signal light beam to an arbitrary region of a hologram recording medium; and changing an incident angle of the signal light beam with respect to the hologram recording medium after the first hologram is recorded and multiplex-recording a second hologram, which is different from the first hologram, in a same region as the region in which the first hologram is recorded by irradiating a signal light beam whose incident angle has been changed and a substantially same reference beam as the reference beam used when recording the first hologram while obtaining at least a part of a diffracted beam from the first hologram simultaneously.

16. The hologram recording/reproducing method according to claim 15, wherein:

a plurality of holograms are angle multiplex-recorded in an arbitrary recording region of the hologram recording medium by successively changing the incident angle of the signal light beam with respect to the hologram recording medium.

17. The hologram recording/reproducing method according to claim 15, wherein:

a plurality of holograms are multiplex-recorded in an arbitrary recording region of the hologram recording medium by rotating at least the signal light beam in such a manner that a plane defined by an optical axis of the signal light beam and an optical axis of the reference beam rotates about, as a rotation axis, an arbitrary axis passing through an intersection of the optical axis of the signal light beam and the optical axis of the reference beam.

18. The hologram recording/reproducing method according to claim 15, wherein:

an image of the diffracted beam from the first hologram is formed and two-dimensional information is obtained from the diffracted beam that is imaged.

19. The hologram recording/reproducing method according to claim 15, wherein:

the signal light beam is formed to be capable of irradiating the hologram recording medium via a plurality of signal light beam irradiation optical systems; and at least one signal light beam irradiation optical system is selected from the plurality of signal light beam irradiation optical systems and a plurality of holograms are multiplex-recorded using a signal light beam from the signal light beam irradiation optical system that has been selected.

20. The hologram recording/reproducing method according to claim 15, wherein:

information recorded as the first hologram is stored temporarily and the recorded information that has been stored is checked against reproduced information generated according to the diffracted beam from the first hologram.

21. The hologram recording/reproducing method according to claim 15, wherein:

a reproducing reference beam is irradiated to a plurality of holograms already multiplex-recorded in a same region of the hologram recording medium so as to reproduce a plurality of diffracted beams from the plurality of holograms simultaneously.

\* \* \* \* \*